(12) United States Patent
Schickel

(10) Patent No.: US 11,204,495 B2
(45) Date of Patent: Dec. 21, 2021

(54) DEVICE AND METHOD FOR GENERATING A MODEL OF AN OBJECT WITH SUPERPOSITION IMAGE DATA IN A VIRTUAL ENVIRONMENT

(71) Applicant: Bitmanagement Software GmbH, Berg (DE)

(72) Inventor: Peter Schickel, Berg (DE)

(73) Assignee: Bitmanagement Software GmbH, Berg (DE)

(*) Notice: Subject to any disclaimer, the term of this patent is extended or adjusted under 35 U.S.C. 154(b) by 0 days.

(21) Appl. No.: 15/916,801

(22) Filed: Mar. 9, 2018

(65) Prior Publication Data

US 2018/0196261 A1 Jul. 12, 2018

Related U.S. Application Data

(63) Continuation of application No. PCT/EP2016/071053, filed on Sep. 7, 2016.

(30) Foreign Application Priority Data

Sep. 9, 2015 (DE) ...................... 10 2015 217 226.0

(51) Int. Cl.
*G02B 27/02* (2006.01)
*G06T 19/00* (2011.01)
(Continued)

(52) U.S. Cl.
CPC .......... *G02B 27/0101* (2013.01); *G06T 13/40* (2013.01); *G06T 15/00* (2013.01);
(Continued)

(58) Field of Classification Search
CPC ..... G06T 19/006; G06T 19/20; G06T 19/003; G06T 2219/024; G06T 2215/16;
(Continued)

(56) References Cited

U.S. PATENT DOCUMENTS

| 7,463,280 B2* | 12/2008 | Steuart, III | H04N 13/243 348/36 |
| 8,994,780 B2* | 3/2015 | Moore | H04N 13/302 348/14.08 |
| 2003/0123713 A1* | 7/2003 | Geng | G06K 9/00288 382/118 |

(Continued)

OTHER PUBLICATIONS

HAO Li et al., "Facial Performance Sensing Head-Mounted Display", ACM Transactions On Graphics (TOG), voi, 34, No. 4, Jul. 27, 2015, pp. 47:1-47:9, XPQ55346825. (Year: 2015).*

(Continued)

*Primary Examiner* — Michael Le
(74) *Attorney, Agent, or Firm* — Michael A. Glenn; Perkins Coie LLP

(57) ABSTRACT

A device for generating a model of an object with superposition image data in a virtual environment includes an image capturing element configured to generate an image data stream of the object as well as a calculating unit configured to extract, from the image data stream, a model of the object from a real environment, to insert the extracted model into the virtual environment, and to superpose at least part of the model with superposition image data so as to generate the model of the object with superposition image data in the virtual environment, and a display element configured to display the model of the object with superposition image data in the virtual environment.

7 Claims, 12 Drawing Sheets

(51) Int. Cl.
*G06T 15/00* (2011.01)
*G02B 27/01* (2006.01)
*G06T 13/40* (2011.01)
*G06T 19/20* (2011.01)
*H04N 7/15* (2006.01)

(52) U.S. Cl.
CPC .......... *G06T 19/003* (2013.01); *G06T 19/006* (2013.01); *G06T 19/20* (2013.01); *H04N 7/157* (2013.01); *G02B 2027/0138* (2013.01); *G06T 2215/16* (2013.01); *G06T 2219/024* (2013.01)

(58) Field of Classification Search
CPC . G06T 15/00; G06T 13/40; G02B 2027/0138; G02B 27/0101; H04N 7/157
See application file for complete search history.

(56) References Cited

U.S. PATENT DOCUMENTS

| | | | |
|---|---|---|---|
| 2009/0128555 A1 | 5/2009 | Benman | |
| 2011/0279634 A1* | 11/2011 | Periyannan | H04N 7/141 348/14.09 |
| 2012/0293632 A1* | 11/2012 | Yukich | H04N 5/247 348/47 |
| 2013/0107001 A1* | 5/2013 | Lim | G03B 35/08 348/46 |
| 2014/0015826 A1* | 1/2014 | Licata | G06T 15/04 345/419 |

OTHER PUBLICATIONS

Peter Eisert, "Virtual video conferencing using 3D model-assisted image-based rendering", Proc. 2nd Conference on Visual Media Production CVMP2005, London, UK, pp. 185-193, Nov. 1, 2005, XP055315774. (Year: 2005).*
HAO Li etal., "Facia! Performance Sensing Head-Mounted Display", ACM Transactions On Graphics (TOG), voi, 34, No. 4, Jul. 27, 2015, pp. 47:1-47:9, XPQ55346825. (Year: 2015).*
Neha Raste, "3D Video Conferencing Using Monoscopic Camera", International Journal of Innovative Research and Development, Jan. 1, 2015, vol. 4, Issue 1, XP055315783.
Peter Eisert, "Virtual video conferencing using 3D model-assisted image-based rendering", Proc. 2nd Conference on Visual Media Production CVMP 2005, London, UK, pp. 185-193, Nov. 1, 2005, XP055315774.
Benjamin Petit et al., "Multicamera Real-Time 3D Modeling for Telepresence and Remote Collaboration", International Journal of Digital Multimedia Broadcasting, vol. 2010, Jan. 1, 2010, pp. 1-12, XP055346822.
Hao Li et al., "Facial Performance Sensing Head-Mounted Display", ACM Transactions On Graphics (TOG), vol. 34, No. 4, Jul. 27, 2015, pp. 47:1-47:9, XP055346825.
Peter Eisert, "Immersive 3-D Video Conferencing: Challenges, Concepts, and Implementations", Visual Communications And Image Processing, Jul. 8, 2003-Jul. 11, 2003, Jul. 8, 2003, XP030080627, pp. 69-79.

* cited by examiner

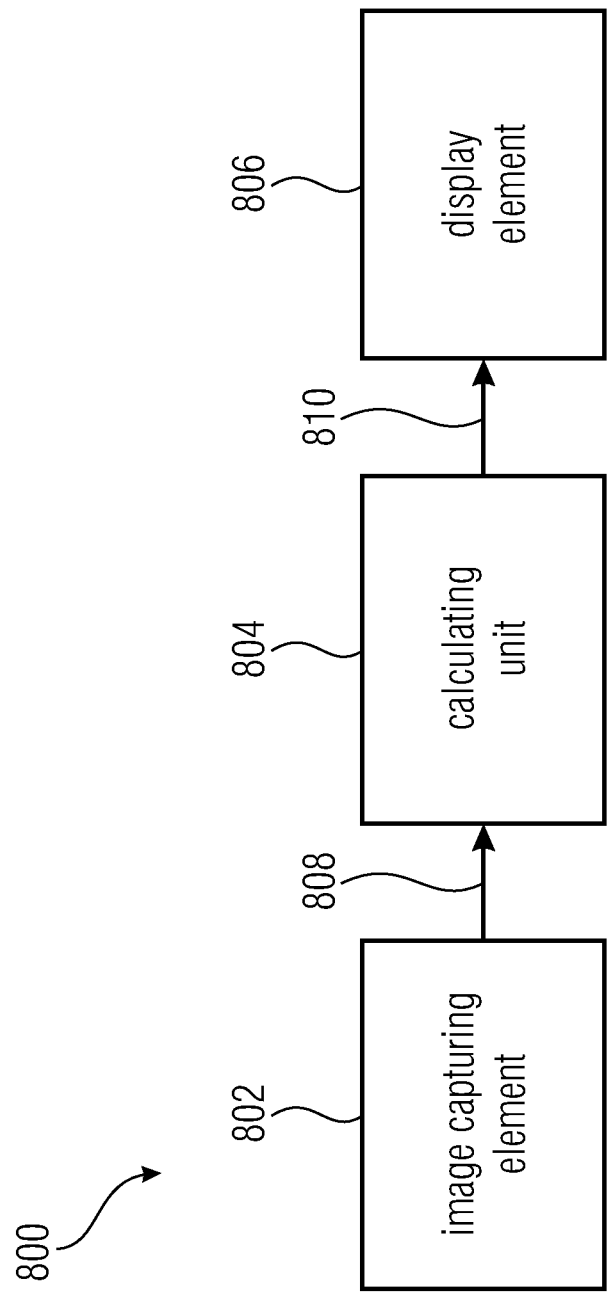

DEVICE AND METHOD FOR GENERATING A MODEL OF AN OBJECT WITH SUPERPOSITION IMAGE DATA IN A VIRTUAL ENVIRONMENT

CROSS-REFERENCES TO RELATED APPLICATIONS

This application is a continuation of copending International Application No. PCT/EP2016/071053, filed Sep. 7, 2016, which is incorporated herein by reference in its entirety, and additionally claims priority from German Application No. DE 10 2015 217 226.0, filed Sep. 9, 2015, which is incorporated herein by reference in its entirety.

The present invention relates to the field of generating models of an object which are enriched with superposition image data, and of inserting the model into a virtual environment. Embodiments show a virtual conference room wherein one or more persons are depicted on the basis of a current video of the person in real time, i.e., without any appreciable delay being noticeable, to the person(s), between their own movements as compared to the movement of the model in the virtual room. The person's area of the face and/or of the eyes, which are covered by the smart glasses are further superposed, or airbrushed out, with the aid of superposition image data, e.g., a previously captured representation of the area of the eyes and/or of the face.

BACKGROUND OF THE INVENTION

For depicting persons, known systems visualizing, e.g., conversations in chat rooms so far have used avatars, i.e., artificial representations which have no or only very little correlation with the person depicted.

SUMMARY

According to an embodiment, a device for generating a model of an object with superposition image data in a virtual environment may have: an image capturing element configured to generate an image data stream of the object; a calculating unit configured to extract, from the image data stream, a model of the object from a real environment, to insert the extracted model into the virtual environment, and to superpose at least part of the model with superposition image data so as to generate the model of the object with superposition image data in the virtual environment; and a display element configured to display the model of the object with superposition image data in the virtual environment; wherein the superposition image data is captured by a camera; or wherein the image capturing element is configured to capture, during an initialization phase, at least part of the object so as to generate the superposition image data, and wherein the image capturing element is configured, in a mode of operation, to generate the image data stream of the object, wherein the image capturing element is configured, during the initialization phase, to scan a person's area of the eyes or a face as the object and to store it as superposition image data, wherein the calculating unit is configured, in the mode of operation, to superpose smart glasses worn by the person with the superposition images obtained during the initialization phase, wherein the calculating unit is configured to adapt the area of the eyes or the face in the superposition image data on the basis of the person's frame of mind and to superpose it with the adapted superposition image data of the person, and wherein the image capturing unit is configured to create a plurality of superposition image data, wherein the calculating unit is configured to determine the frame of mind by means of a comparison of current positions of the person's corners of the mouth with positions of the corners of the mouth in the plurality of superposition image data, and to select that superposition image which renders the current facial expression in the best manner possible.

According to another embodiment, a method of generating a model of an object with superposition image data in a virtual environment may have the steps of: generating an image data stream of the object; extracting a model of the object from the image data stream from a real environment; inserting the extracted model into the virtual environment; superposing at least part of the object with the superposition image data so as to generate the model of the object with superposition image data in the virtual environment; and displaying the model of the object with superposition image data in the virtual environment, wherein the superposition image data is captured by a camera; or wherein generating of the image data stream of the object is performed in a mode of operation, and wherein prior to generating the image data stream, at least part of the object is captured during an initialization phase so as to generate the superposition image data, wherein during the initialization phase, a person's area of the eyes or face is scanned as an object and stored as superposition image data, wherein smart glasses worn by the person are superposed, in the mode of operation, with the superposition images obtained during the initialization phase, wherein the area of the eyes or the face in the superposition image data is adapted on the basis of the person's frame of mind, and is superposed with the adapted superposition image data of the person, and wherein a plurality of superposition image data are created, wherein the frame of mind is determined by means of a comparison of current positions of the person's corners of the mouth with positions of the corners of the mouth in the plurality of superposition image data, and the superposition image which renders the current facial expression in the best manner possible is selected.

According to another embodiment, a non-transitory digital storage medium may have a computer program stored thereon to perform the inventive method, when said computer program is run by a computer.

Embodiments show generation of a model from an image data stream, e.g., a (real-time) video stream. If the object is a person, for example, the person may have a face or an area of the eyes of another, e.g., well-known, person superposed thereon. In addition, it is possible, if the person wears smart glasses during generation of the image data stream, to replace and/or to superpose the smart glasses of the model in the virtual environment with a picture of the person's area of the eyes or the face without the smart glasses, which picture is held in a memory, for example.

In accordance with embodiments, the model may be a two-dimensional representation of the person which is enriched with 2D superposition image data. However, what is advantageous are embodiments wherein a three-dimensional representation and/or model of the object, e.g., of the person, is generated, and wherein said three-dimensional model is superposed with three-dimensional superposition image data. In accordance with a first aspect, the three-dimensionality may be depicted from an angle of vision, i.e., for example, the front side of the object. This is generated, for example, by means of a 3D camera which captures the object from the front. A 3D camera includes, e.g., two (commercially available) cameras which are arranged at a mutual distance corresponding to a typical distance between a person's eyes. In accordance with a further aspect, however, the object may also be depicted completely three-dimensionally, i.e., such that a 360° view around the object is possible, for example. For this purpose, at least one further 3D camera capturing the rear side of the object is advantageous. Alternatively or additionally, a 3D camera may also perform a 360° scan of the object in that the 3D camera moves around the object on one or more circular paths or a helix and thus obtains a 3D view of the object from (almost) any angle of vision possible.

Further embodiments show that, e.g., during superposition of the smart glasses with the face or area of the eyes that is taken from the superposition image data, distinctive points in the superposition image data in the face such as the eyes or the mouth may be adapted to the person's frame of mind. For example, corners of the mouth which point upward may suggest that the person is laughing, so that also the area of the eyes which has been inserted represents laughing eyes, i.e., eyes which are slightly squinted. Said modification is applied to static superposition image data, e.g., by means of an image processing algorithm, so that the static superposition image data has a dynamic effect. Further embodiments show that a plurality of superposition image data is held or stored; for example by comparing the current picture of the mouth with a mouth taken from the stored superposition image data results in a suitable area of the eyes to be superposed or a suitable face.

BRIEF DESCRIPTION OF THE DRAWINGS

Embodiments of the present invention will be detailed subsequently referring to the appended drawings, in which:

FIG. 3a-b schematically shows the procedure of removing the background from a scene in accordance with an embodiment, wherein FIG. 3(a) shows the scene initially captured, and FIG. 3(b) shows the scene without any background;

FIG. 8 shows a schematic block diagram of the device for generating a model of an object with superposition image data in a virtual environment;

DETAILED DESCRIPTION OF THE INVENTION

Figure 1:
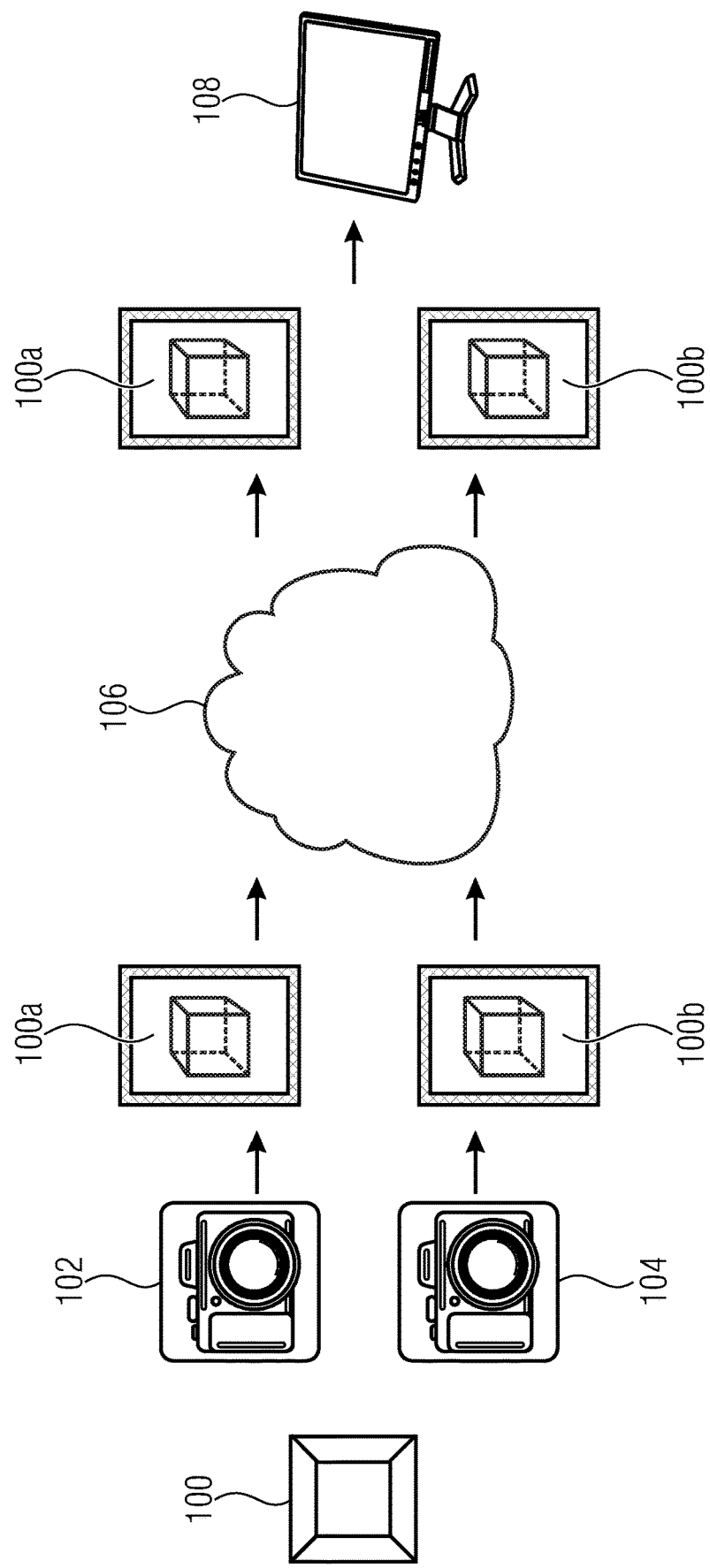
FIG. 1 shows a schematic depiction of a conventional approach to manufacturing, transmitting and depicting a stereoscopic film including a multitude of frames.

In the below description of the advantageous embodiments, elements which are identical or identical in function will be provided with identical reference numerals.

FIG. 8 shows a schematic block diagram of a device 800 for generating a model of an object with superposition image data in a virtual environment. The device 800 comprises an image capturing element 802, a calculating unit 804 and a display element 806. The image capturing element 802 is configured to generate an image data stream 808 of the object and to send it to the calculating unit 804. The image data stream may be a sequence of frames, e.g., a (live or real-time) video or video stream. The calculating unit 804 is configured to extract, from the image data stream 808, a model of the object from a real environment, to insert the extracted model into the virtual environment and to superpose at least part of the model with superposition image data so as to generate the model 810 of the object with superposition image data in the virtual environment and to send it to the display element. The display element 806 is further configured to display the model 810 of the object with superposition image data in the virtual environment. Advantageous implementations for generating and possibly transmitting the model of the object will be shown below with reference to FIGS. 1 to 7. FIGS. 8 to 12 show embodiments for depicting the model with superposition image data in the virtual, e.g., computer-generated, environment.

Figure 9A:
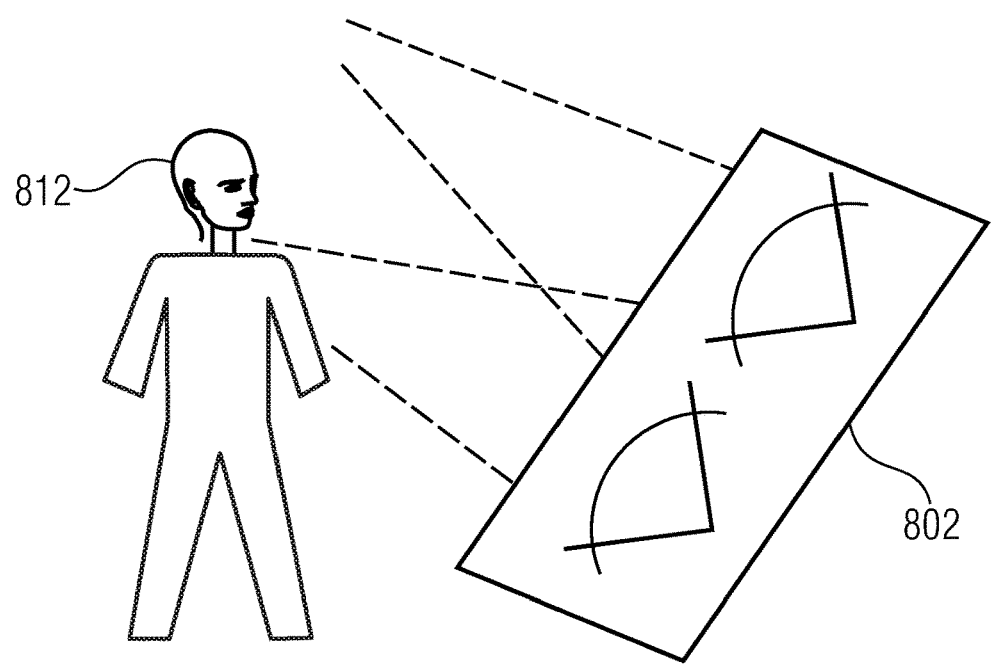
FIG. 9a shows a schematic representation of the image capturing element during the initialization phase.
Figure 9B:
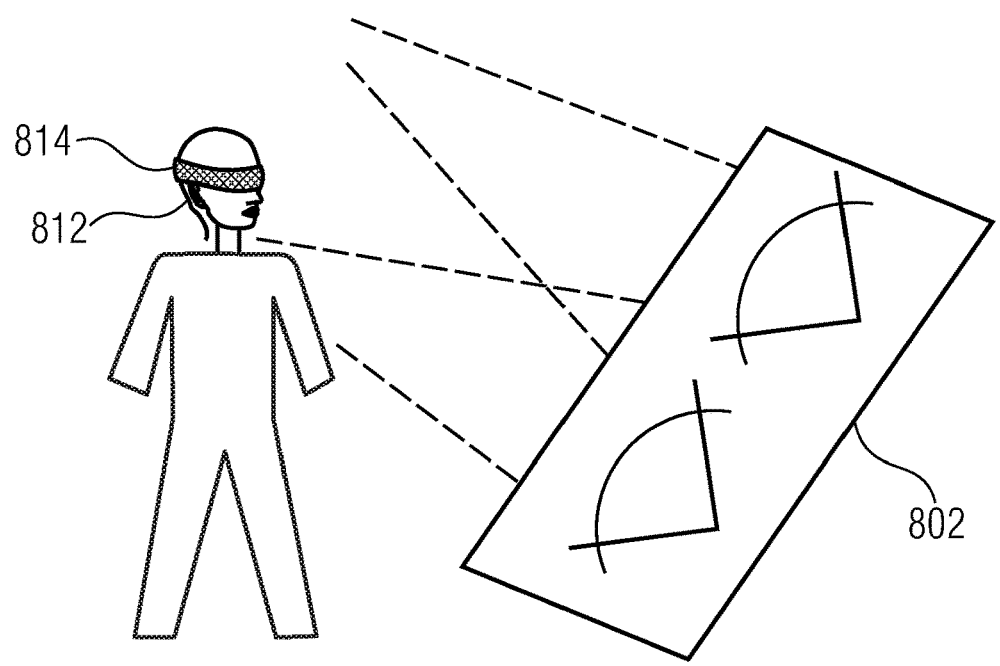
FIG. 9b shows a schematic representation of the image capturing element in a mode of operation.

FIG. 9a shows a schematic representation of the image capturing element 802 during an initialization phase. During the initialization phase, the image capturing element 802 is configured to capture at least part of the object 812 so as to generate the superposition image data. FIG. 9b shows the image capturing element 802 in a mode of operation wherein the image capturing element is configured to generate the image data stream 808 of the object 812. The object 812 here is schematically depicted as a person, wherein, during the initialization phase in FIG. 9a, the person's face and/or area of the eyes are scanned and stored as superposition image data. The superposition image data may be static (frame) or dynamic ([short] video sequence).

In the mode of operation (cf. FIG. 9b), the object 812, which here again is a person, wears smart glasses 814, in accordance with embodiments, which display the virtual environment. The image capturing element 802 now captures the object 812, e.g., the person's head or upper body, and generates a model of the person's head or upper body in the virtual environment. However, at this point in time, the model still depicts the smart glasses 814 on the person's head. The smart glasses may superpose, or texture, the calculating unit by means of the superposition image data obtained, e.g., during the initialization phase, such that the model's area of the eyes or the face is generated from the superposition image data, and the remaining part of the model is generated from the image data stream.

In accordance with embodiments, the calculating unit is configured to determine a current outward appearance of the object 812 and to adapt the superposition image data on the basis of the determined current outward appearance. For example, the outward appearance is a person's smile or another facial expression which may be determined from the facial features, e.g., the corners of the mouth. Static superposition image data, e.g., a frame, may now be manipulated such that the area of the eyes in the superposition image data is adapted to the current facial expression. Thus, the area of the eyes may be processed, by means of image processing algorithms, such that the eyes appear to be slightly squinted so as to represent a smile. Thus, dynamics may be created in the superposition image data. In accordance with further embodiments, it is also possible to create a plurality of superposition image data, e.g., of different facial expressions. Thus, the current position of the person's corners of the mouth may be compared to the positions of the corners of the mouth in the superposition image data. Thus, it is possible to select that superposition image which renders the current facial expression in the best manner possible and to superpose the entire face or only the area of the eyes of the model with the superposition image data. In this manner, dynamics may here be generated in the superposition image data on the basis of the static superposition image data. In other words, the calculating unit may select superposition image data from a plurality of superposition image data on the basis of the determined current outward appearance, and may superpose the part of the object with the selected superposition image data.

In other words, the image capturing element may be configured, during the initialization phase, to scan a person's area of the eyes or a face as an object and to store same as superposition image data, the calculating unit being configured to superpose, in the mode of operation, smart glasses worn by the person with the superposition images obtained during the initialization phase. Thus, the calculating unit may adapt the area of the eyes or the face in the superposition image data on the basis of the person's frame of mind and superpose it with the adapted superposition image data of the person. In addition, the image capturing unit may create a plurality of superposition image data, the calculating unit being configured to compare the frame of mind by comparing current positions of the person's corners of the mouth with positions of the corners of the mouth in the plurality of superposition image data and to select that superposition image which renders the current facial expression in the best manner possible.

In accordance with embodiments, the current outward appearance of the object may be determined 30 to 60 times per second, 35 to 55 times per second, or 40 to 50 times per second. Advantageously, the current outward appearance of the object, e.g., a person's facial expression, is determined, for each image or frame of the image data stream, as a mean value or median from a plurality of images or frames of the image data stream. Thus, also the image data stream may comprise 30 to 60 images per second, 35 to 55 images per second, or 40 to 50 images per second or a multiple thereof. Said comparatively high refresh rate enables updating of the model in the virtual environment in real time, i.e., such that, provided the transmission rate is sufficient, no visible difference can be discerned by a human being between the object in the real environment and the object in the virtual environment. With regard to FIGS. 1 to 7, embodiments are shown which reduce the amount of data of the model as compared to known methods of generating the models; thus, a sufficient transmission rate is ensured even in case of a small bandwidth.

In accordance with an embodiment, the latency, or delay, of the object in the virtual environment as compared to the object in the real environment amounts to less than 50 ms, less than 30 ms or less than 20 ms.

FIGS. 9a and 9b show, by way of example, a 3D camera as the image capturing element 802. For creating a complete 3D view, i.e., a perspective enabling a 360° view around the model of the object, the 3D camera may move around the object 812 and continuously take pictures. Alternatively, it is also possible to arrange a further 3D camera disposed, e.g., opposite the first 3D camera and capturing the object 812 from two different perspectives. Further 3D cameras may generate a higher level of detail and/or an improved 3D effect of the object 812 and/or of its model. This also applies to generating the superposition image data and to generating the image data stream of the object. Alternatively, further forms of superposition image data are also feasible. For example, it is possible to superpose the model's face with a (famous) person's face instead of the area of the eyes. Alternatively, it is also feasible to cover one's own face and/or area of the eyes with a mask so as to preserve one's anonymity, e.g. in a chat room. The calculating unit accordingly is configured to generate a three-dimensional model of the object with superposition data from the image data stream, the display element being configured to display the 3D model of the object with superposition image data in the virtual environment.

Figure 10A:
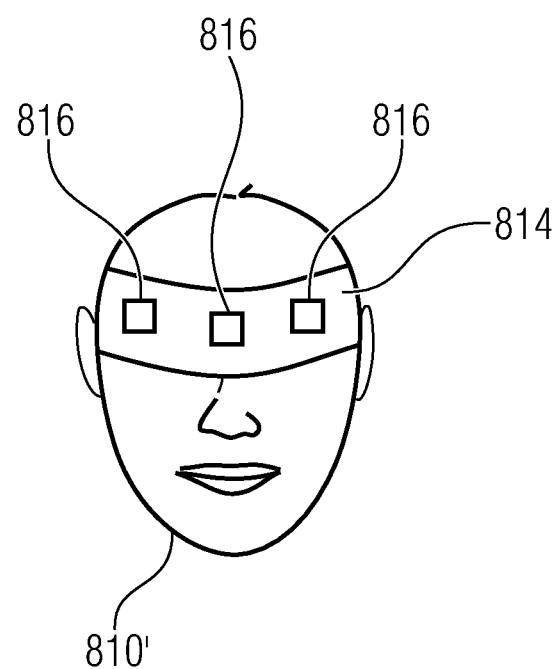
FIG. 10a shows a schematic representation of the model of the object without any superposition image data.

FIG. 10a shows a schematic representation of the model 810' without any superposition image data in accordance with an embodiment, the model representing a person's face. In the model, the person further wears the smart glasses 814 which, in accordance with embodiments, are provided with markers 816 enabling precise localization, or determination of the position, of the smart glasses 814 on the person's head. The markers are LEDs or reflectors, for example.

Figure 10B:
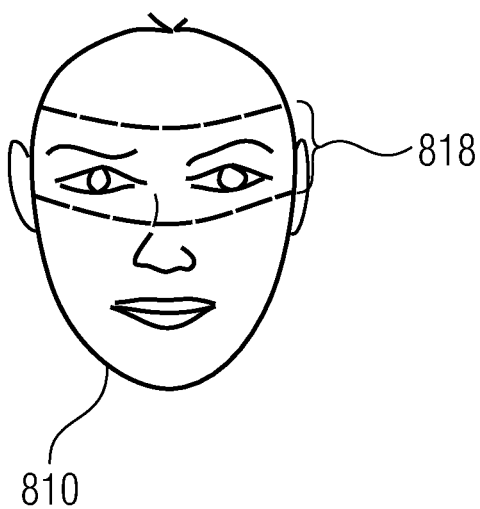
FIG. 10b shows a schematic representation of the model of the object with superposition image data.

FIG. 10b shows a schematic representation of the object 810 with superposition image data 818. In accordance with the depiction of FIG. 10b, the superposition image data may be the person's area of the eyes which replace the area of the smart glasses 814. In addition, it is also possible, as was already described, to replace the entire face or an alternative or any part of the object.

Alternatively or additionally to using markers, it is also possible to use distinctive points on the object, e.g., a person's nose and/or mouth, as a reference for the position or the alignment of the superposition image data. For example, the calculating unit may recognize the pose of the head by means of the nose and/or the mouth, so that the superposed area of the eyes is aligned in relation to the pose of the head and is inserted in the suitable place.

Figure 11:
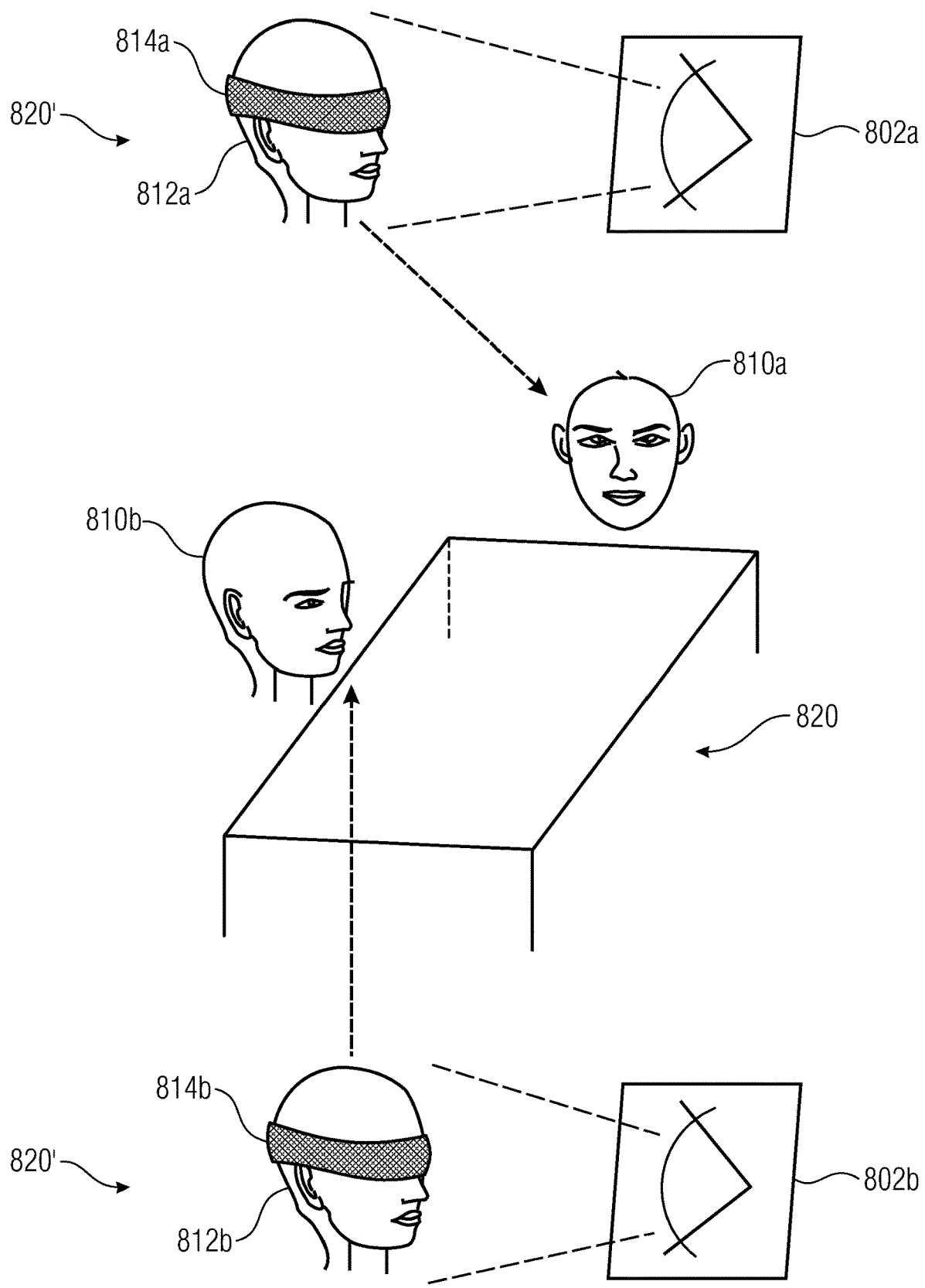
FIG. 11 shows a schematic representation of an advantageous embodiment of a virtual conference room.

FIG. 11 shows a schematic representation of an advantageous embodiment of the present invention. The top and the bottom of FIG. 11 show an object 812a, 812b, respectively, here a person's head, in a real environment 820'. There, the person is captured by means of the image capturing element 802a, 802b so as to generate an image data stream of the person's head and to send it to the calculating unit. Now the calculating unit may generate, on the basis of the image data stream, a model of the object 812a, 812b and, for example, superpose the smart glasses 814a, 814b with the person's area of the eyes, so that the calculating unit generates the model 810a, 810b with superposition image data. In accordance with embodiments, the models with the superposition image data may be sent to a central server configured to provide a shared virtual environment and to integrate the models 810a, 810b into the shared virtual environment 820. Therefore, in accordance with said embodiment, the calculating unit is distributed across two systems.

Unlike the representation of FIG. 11, the models 810a, 810b may be configured such that a 360° view of the model is possible. For example, the user 812a may adjust, by means of an input device, their angle of vision in the virtual environment 820 irrespectively of the person 812*b*. Thus, the user 812*a* obtains an individual view of an external observer (third person view) of the model of himself/herself and of the person 812*b* in the virtual environment 820. Thus, the persons 812*a* and 812*b* may be virtually seated opposite each other and hold their meeting in the virtual conference room. In addition, it is also possible to integrate illustrative objects as models and/or holograms into the virtual conference room. For example, it is possible to integrate, from a third location, the (faithful) model of an object, e.g., of a car, into the conference room; the model's orientation, size and/or level of detail may be individually and independently adapted by each of both persons 812*a*, 812*b*.

Embodiments show that both the image data stream and the superposition image data are generated, or captured, by a camera. Thus, an improved impression of reality may be imparted on the user as compared to computer-generated avatars or such avatars where, e.g., only the upper body is captured and computer-animated legs are inserted so as to provide the avatar in the virtual world with the possibility to move. The captured camera image may be transferred to a 3D model by means of the approach described in FIGS. 1 to 7 so as to enable reduction of the amount of data to be transmitted. The reduction in data is not limited to this method, however, and is additionally entirely optional since also the non-compressed captured camera images may be transmitted. In particular for the image data stream, compression of the video and/or of the frames of the image data stream is advantageous.

The superposition image data may already be captured in advance and be stored in the calculating unit. Since one field of application of the described device is a virtual meeting and/or conference room, the calculating unit may be arranged in a decentralized manner with the participants of the conference. In order to efficiently use the superposition image data, said data may once be exchanged, e.g., between the calculating units of all participants and/or may be transmitted to same. To this end, the captured images or photos or video sequences of the superposition image data may be used without converting them to a corresponding model.

In order to separate the captured objects in the image data stream and/or in the superposition image data from their real backgrounds, they may be captured, e.g., in a "green box" (against a green or a blue background) so that the object may be inserted into the virtual environment by means of chroma keying.

Embodiments further show that the depicted device may be used for visualizing cosmetic corrections. For example, lips which have different types of lipstick on them may be stored as superposition image data, so that the user may superpose their own lips, on the basis of the set of stored superposition image data, with the lips which have put lipstick on them according to his/her choice. Thus, users may obtain a better impression in terms of whether the color of lipstick selected matches the remaining outfit since they see both in combination. In order to generate the superposition image data, the user may put on different lipsticks once in advance and/or during an initialization phase and store the superposition image data as a picture of their own lips. In addition, the user may thus put on makeup in the virtual world as well and, thus, e.g., for a (professional) meeting without having to spend time on putting on makeup in their real life. Additionally or alternatively, the manufacturers of lipsticks may provide corresponding samples as superposition image data. The lips here have been selected by way of example; however, the principle may be applied to any cosmetic corrections, e.g., also a different hair style or hair color. It is also possible to retouch a pair of reading or corrective glasses.

A similar principle may be applied to general modification of (facial) attributes. For example, the superposition image data may be processed (using the computer) such that specific attributes of the user are modified. This principle may be applied, e.g., in cosmetic surgery so as to provide the user with an idea of how he/she will look like after a potential operation.

Figure 12:
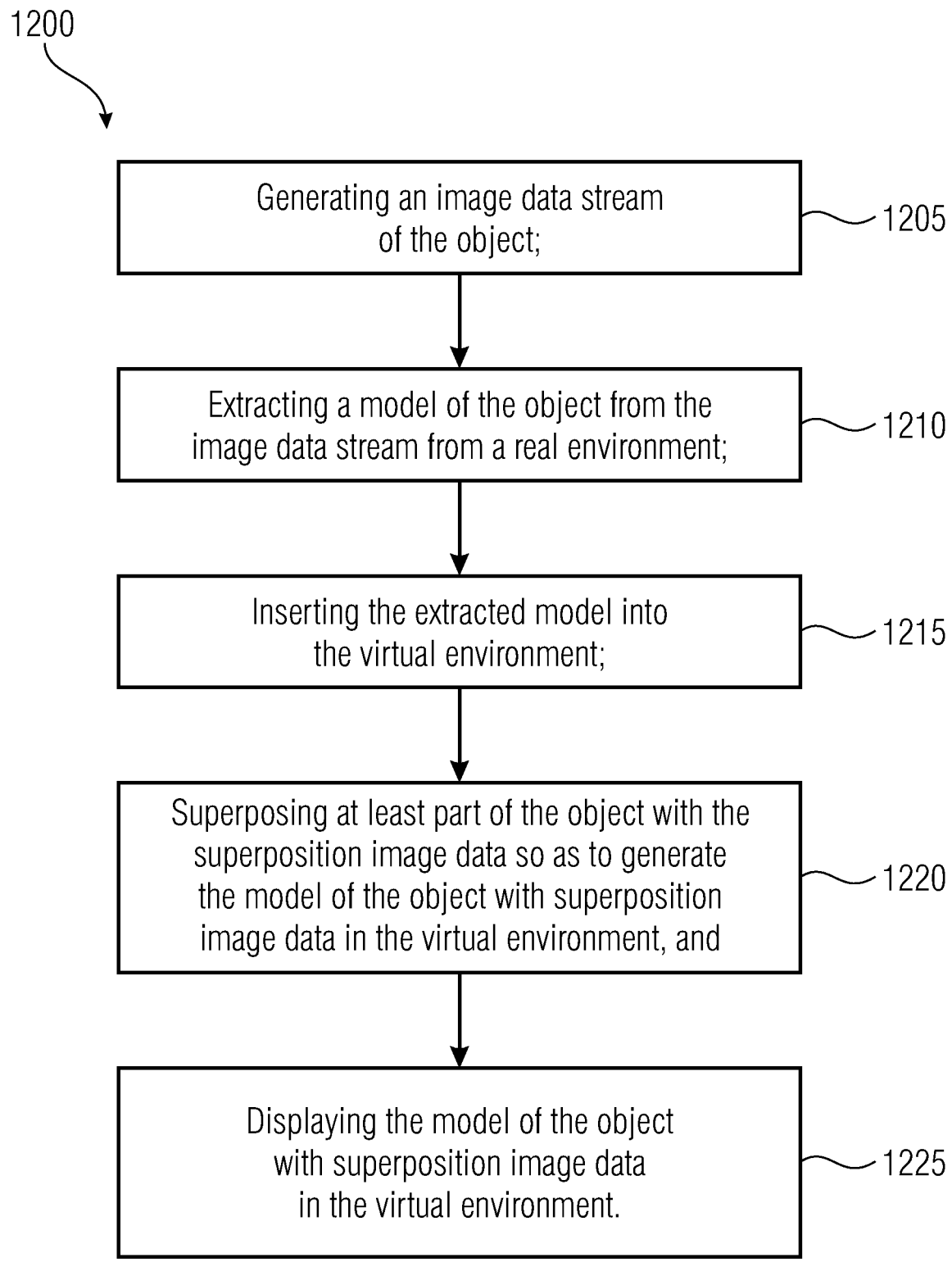
FIG. 12 shows a schematic block diagram of a method of generating a model of an object with superposition image data in a virtual environment.

FIG. 12 shows a schematic block diagram of a method 1200 of generating a model of an object with superposition image data in a virtual environment. The method 1200 comprises a step 1205 of generating an image data stream of the object, a step 1210 of extracting a model of the object from the image data stream from a real environment, a step 1215 of inserting the extracted model into the virtual environment, a step 1220 of superposing at least part of the object with the superposition image data so as to generate the model of the object with superposition image data in the virtual environment, and a step 1225 of displaying the model of the object with superposition image data in the virtual environment.

Embodiments in particular for generating the model of the object will be described below with reference to FIGS. 1 to 7. In accordance with embodiments, the model comprises a reduced amount of data in storing or transmitting of the model. Thus, the above-mentioned embodiments may be performed in real time even in the event of low transmission rates and/or bandwidths. However, the following embodiments are only meant to be examples, and generation of the model is not limited thereto. In other words, the models may also be created in alternative methods.

Conventional technology has known various approaches to generating and indicating a three-dimensional depiction of an object, e.g. in the form of a sequence of single images, or frames, or of a 3D film. FIG. 1 shows a schematic depiction of a conventional approach to producing, transmitting and depicting a stereoscopic film including a multitude of single images. For simplicity's sake, FIG. 1 shows a cube 100 as the object to be depicted. A first camera 102 generates a first image 100*a* of the cube from a first perspective, and a second camera 104 generates a second image 100*b* of the cube from a second perspective different from the first perspective. In other words, the pictures 100*a* and 100*b* of the cube 100 are generated from different angles of view. The single images 100*a*, 100*b* which have been thus generated and received are provided to a suitable stereoscopic reproduction unit 108, e.g. a monitor, for depiction. Instead of cameras 102 and 104, it is also possible to employ a shared 3D camera, which will also take two pictures of the object 100, which will then be transmitted, in the above-described manner, to the monitor 108 for depiction.

The conventional approach described by means of FIG. 1 is disadvantageous since the amount of data of at least two images 100*a* and 100*b*, which is to be transmitted via the transmission medium 106, is very large, which involves a correspondingly long data transmission time period. Even if the two-dimensional pictures or images 100*a*, 100*b* are compressed, the amount of time involved in compressing the data will be large, so that the overall transmission time from the point where the picture of the object 100 is generated to the point where three-dimensional reproduction is to occur is very long. For example, let us assume a stereoscopic picture of the cube 100, and with the procedure described by means of FIG. 1, the following storage space may be used for transmitting the data which are useful for depiction of a frame of the cube on the monitor 108 while assuming an image size of 1024×768 pixels: 2 images×1024 (X value)× 768 (Y value)×3 (RGB color value)=4,718.592 bytes.

Said large amount of data results in the long transmission time periods mentioned above and renders transmission of moving pictures of a moving object in a three-dimensional implementation almost impossible, since for this purpose a transmission of up to 30 frames per second is useful, each frame comprising the amount of data indicated above. Thus, such a transmission of a moving object 100, the movement of which is to be depicted in a three-dimensional manner at the receiving side 108, is possible only with a large time delay, so that, in particular, a livestream or the like is not possible at all. Transmission of a 3D film is also virtually impossible due to the bandwidth that may be used.

The above-mentioned transmission of a livestream in a three-dimensional quality, or transmission of a three-dimensional live sequence, is desired, for example, in the context of taking pictures of people and ambient spaces. Taking pictures of people and ambient spaces while using 3D cameras, and reproducing same as a 3D film involves the above-mentioned problem of the enormous amounts of data which cannot be transmitted on the internet, which is due to the fact that the data may be stored and transmitted as conventional sequences of 2D images. Approaches known in conventional technology deal with encoding and transmitting of 2D image data from video recordings; however, the amount of data and the associated amount of encoding time are too large for said two-dimensional solution in connection with 3D image data, so that the fundamental problem of transmitting the data that may be used for three-dimensional depiction of an object, e.g. also as a moving picture, remains.

Figure 2:
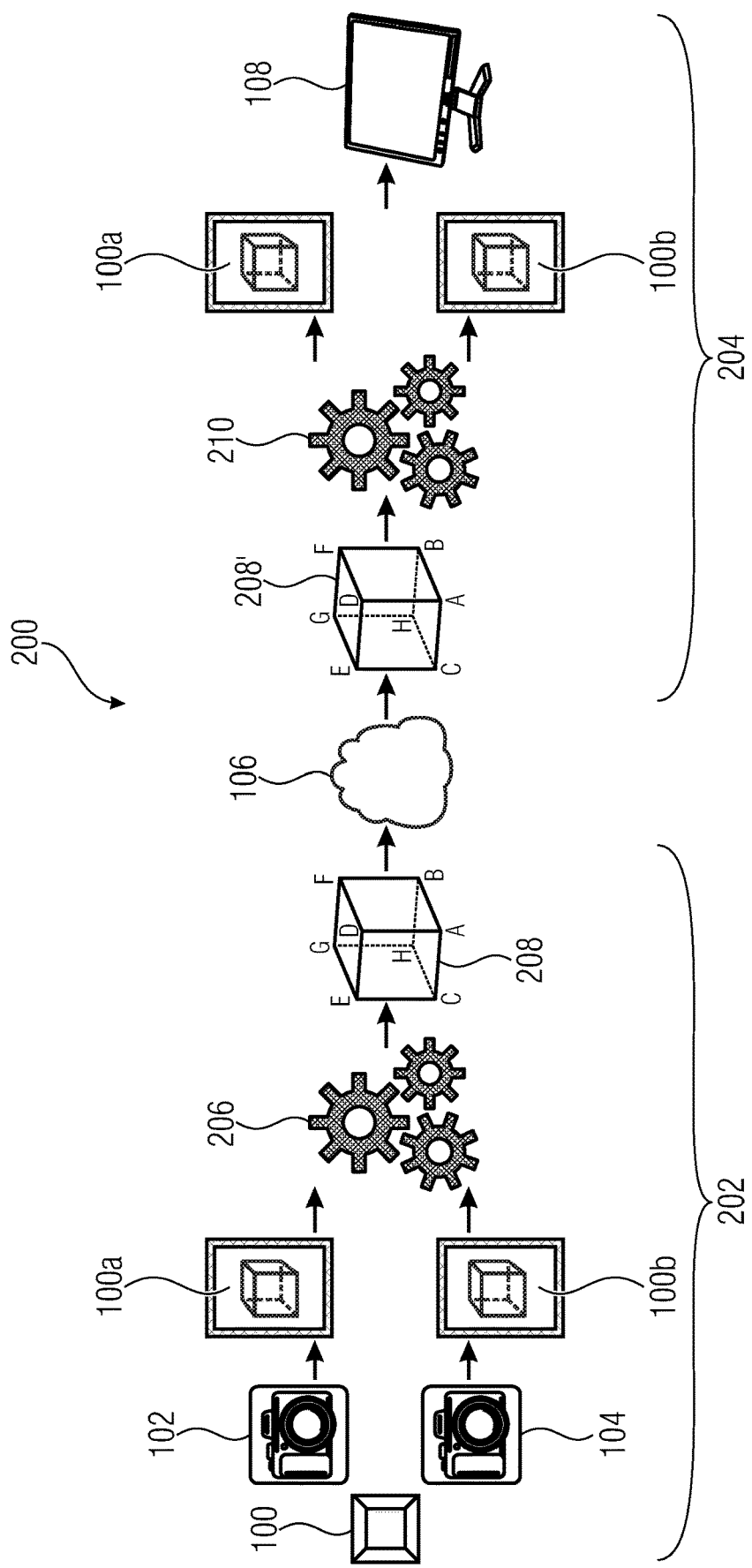
FIG. 2 shows a schematic depiction of the inventive procedure of manufacturing, transmitting and depicting a stereoscopic film with individual models generated from a 3D engine.

FIG. 2 shows a schematic depiction of a procedure of manufacturing, transmitting and depicting a stereoscopic film with individual models generated from a 3D engine. Similarly to FIG. 1, also for FIG. 2 one chooses the three-dimensional image of a cube 100 as a basis for explaining the approach. FIG. 2 shows a schematic overall depiction of the system 200 in accordance with embodiments for generating a three-dimensional depiction of at least part of an object, namely of the cube 100. The system 100 includes the transmission medium 106, which has already been described by means of FIG. 1 and is arranged between a transmitter side 202 and a receiver side 204. Elements which have already been described with reference to FIG. 1 are provided with identical reference numerals in FIG. 2 and will not be explained again in detail.

The transmitter side 202 shown in FIG. 2 may include, e.g., a device for generating data for three-dimensional depiction of at least part of an object, the device in accordance with the embodiment shown including a 3D engine 206, which is schematically depicted in FIG. 2 and which obtains, as an input, the 3D image including the two pictures 100a and 100b of the cube 100. On the basis of the 3D image, the 3D engine generates a model 208 of the cube 100 including the vertices A to H, which are arranged at different positions within the room. Depending on the different perspectives from which the cube 100 is captured, the 3D model generated by the 3D engine 206 includes either the entire object, i.e., the entire cube 100, or only part of the cube 100. In the embodiment depicted in FIG. 2 it shall be assumed that there exists only a single 3D image of the cube 100 from one perspective, so that in accordance with said embodiment, the 3D model would depict only the front side and the upper side of the cube, and so there would exist only the vertices A to G.

In other embodiments, provision may be made for capturing the cube from a second perspective differing from the first perspective, so that the cube's rear side and possibly even its bottom may be imaged as a model; in this case, the 3D engine 206 would generate a 3D model of the cube 208 which includes the vertices A to H, i.e., a 3D model which may be viewed from all sides, on the basis of the input data, namely on the basis of the two 3D images.

In accordance with embodiments, the 3D engine 206 is effective to define the 3D model 208 of the cube 100 in the form of the vertices A to H and as color values associated with the corresponding vertices. The scene captured by the camera 102, 104 and including the cube 100, for example, provides, at the output of the 3D engine 206, a single image including color values and depth information. In accordance with an embodiment, the color values each consist of one byte for red, one byte for green and one byte for blue (RGB) color value, i.e., of three bytes in total. The depth information includes the X, Y and Z values for the vertices of the 3D model within the three-dimensional room. In accordance with embodiments, the X, Y and Z values may each be stored as floating-point numbers with simple accuracy, with a length of, e.g., 32 bits. The sequence of X, Y and Z values is referred to as vertices, and the sum of all of the vertices of the 3D model 208 is referred to as a point cloud.

If one compares the procedure of conventional technology as was explained by means of FIG. 1, and the approach described above, what results is an enormous reduction in data due to the depiction of the object 100 in the form of a 3D model defined via the vertices and the color values. As was already explained above, conventional approaches generate a data set, which is to be transmitted, for a cube having a size of 4,718.592 bytes, on the basis of images having resolutions of 1024×768 pixels, so that given two images and three color values, the number of bytes which has just been mentioned results. In contrast to this, the above approach is clearly advantageous since an enormous reduction in the amount of data is achieved since, e.g., with the procedure depicted in FIG. 2, when assuming that the 3D model 208 depicts a full reproduction of the cube 100, only 8 vertices with a floating-point value of 4 bytes each may be used, and in each case 3 bytes as the color value, so that only 8×4×3 bytes=96 bytes may be used as the amount of data for a frame/single image for depicting the 3D object 100.

It shall be noted with regard to FIG. 2 that the example which is shown there of generating data for three-dimensional depiction of a cube 100 represents no restriction; in actual fact, the object 100 may be any "thing" having a structure of any complexity desired, for example also a depiction of a person or a machine. The 3D engines shown in FIG. 2 may be implemented by computer systems, for example, which are possibly suitably equipped, in terms of hardware, for generating 3D models and which have corresponding software for execution provided thereon.

In accordance with embodiments, the device 202 is configured to repeatedly generate a 3D image 100a, 100b of the object 100 so as to provide data for a multitude of successive frames for transmission via the medium 106 in order to depict a 3D live sequence, or a 3D film, on the receiver side 204. To achieve this, up to 30 frames are generated per second by the device 202 in accordance with embodiments, i.e., up to 30 single pictures are taken of the object 100. Each single picture is encoded, in accordance with the above explanations, via the 3D engine 206 and while using the 3D model, so that each of the 30 frames contains one data set per second, which contains, at the time of the shooting, the vertices and the color values of the object 100 which are associated with the vertices.

The device 202 and the method implemented by it is advantageous since an amount of data transmitted via the transmission medium 106 is clearly reduced, which is why the transmission time is also clearly reduced. From this point of view, the amount of time involved in calculating the 3D models is shorter than the amount of time involved in compressing single images in accordance with conventional technology. In addition, complete transmission of the 3D information via the 3D model offers the possibility, on the receiver side, to freely select a visual focus on the object on the receiver side since the actual images are generated and displayed on the receiver side by a 3D engine during run time following transmission of the data of the 3D model. More specifically, in accordance with embodiments, the data (the data set) describing the 3D model 208 generated on the transmitter side is transmitted to the receiver side 204 via the transmission medium 106, so that the corresponding data describing the 3D model 208' will be present on the receiver side 204. Said data is supplied to a 3D engine 210, which on the basis of the 3D model generates the 3D image of the object in the corresponding frame, e.g., the two images 100a, 100b, which will then be provided, just like in conventional technology, to a suitable monitor 108 or to a different suitable display device for three-dimensional depiction of the object on the receiver side 204.

In accordance with embodiments, what is taught thus is an approach wherein transmission of a sequence of individual 3D models is performed rather than transmission of a sequence of individual 2D images, as is the case in conventional technology. The 3D models 208 are generated, prior to transmission, with the aid of the 3D engine 206, the 3D engine identifying edges, e.g., from the images 100a, 100b and generating the 3D model on the basis of the edges identified. For example, the 3D engine 206 may determine shared regions in the images 100a, 100b, e.g., shared edges which belong to the object 100, so as to therefrom determine the resulting 3D model, or 3D mesh of the object 100. Following transmission, the 3D model described by the vertices and color values is converted into the two images 100a and 100b by the receiver-side 3D engine 210 so as to depict the 3D object from different angles of view with the single images 100a and 100b, which will then be depicted on the stereoscopic output device 108.

Further embodiments will be explained below. It shall be assumed that as an object, a person is to be captured who finds himself/herself within a scene. The scene includes the person standing in a room and slightly moving to and fro in his/her place, for example. In accordance with embodiments, provision is made for the device 202 (see FIG. 2) to capture 30 frames of said scene per second, and to generate a corresponding 3D model of the scene for each frame and to describe it by means of the vertices and color values. The data which is thus generated for each frame (each single image) includes, as was mentioned above, the color values and the depth information, e.g., RGB values and X Y and Z values, each of which defines a vertex, the plurality of vertices forming a point cloud. In accordance with embodiments, it may be desired to extract the background from the scene, for example when only the depiction of the person is to be transmitted to the receiver side 204 (see FIG. 2) and is to be depicted there, e.g., with a different background which is either transmitted in advance or in parallel from the transmitter to the receiver or is predefined at the receiver.

For removing the background, the background is initially extracted from each individual point cloud, i.e., those vertices which are identified as belonging to the background are deleted from the multitude of vertices which exist for one single image (=individual point cloud). In accordance with embodiments, the Z value of each individual vertex is compared to a corridor distance (threshold-value distance) of the area where the person to be depicted is standing, and distances which indicate that a vertex is further away or closer than the corridor distance will be identified as a background vertex and be omitted, i.e., only those vertices will be allowed which lie within the corridor distance, and the data thus obtained is that data which reproduces the person within a point cloud. In other words, the number of vertices defining the point cloud per single image is reduced by those which are clearly associated with the background.

Figure 3A:
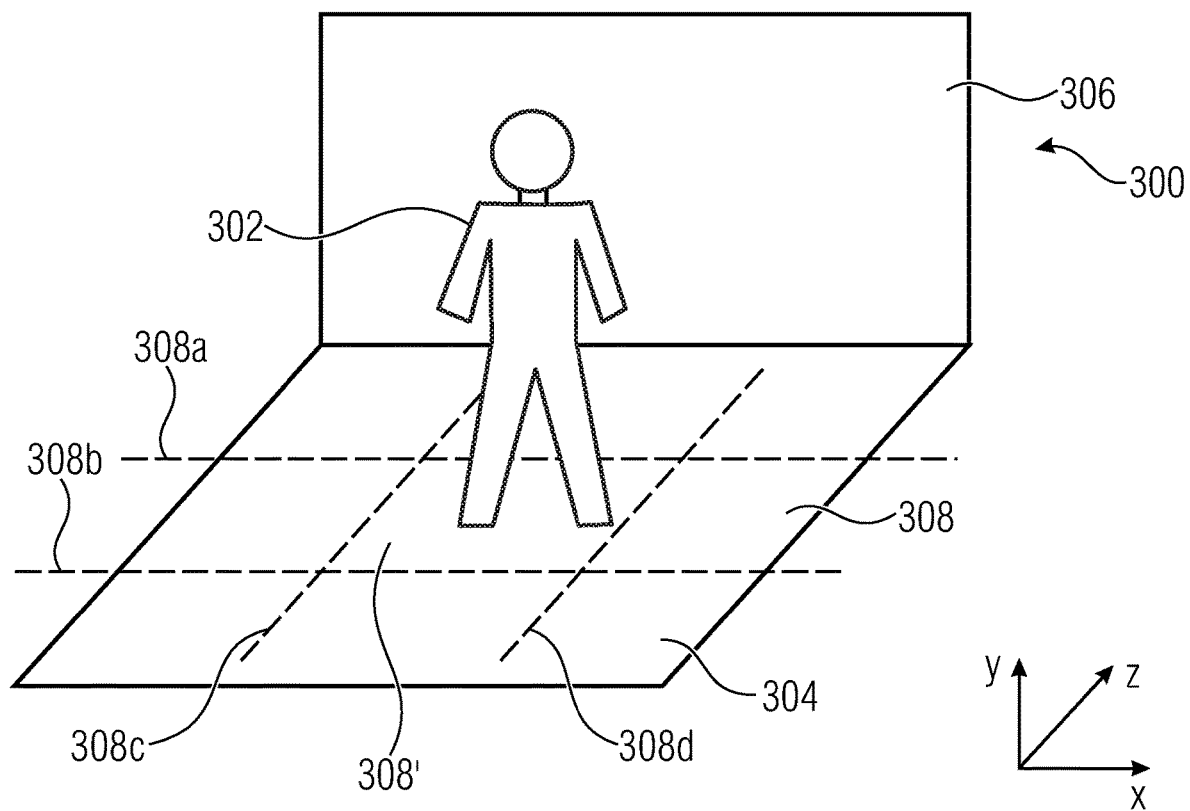
Figure 3B:
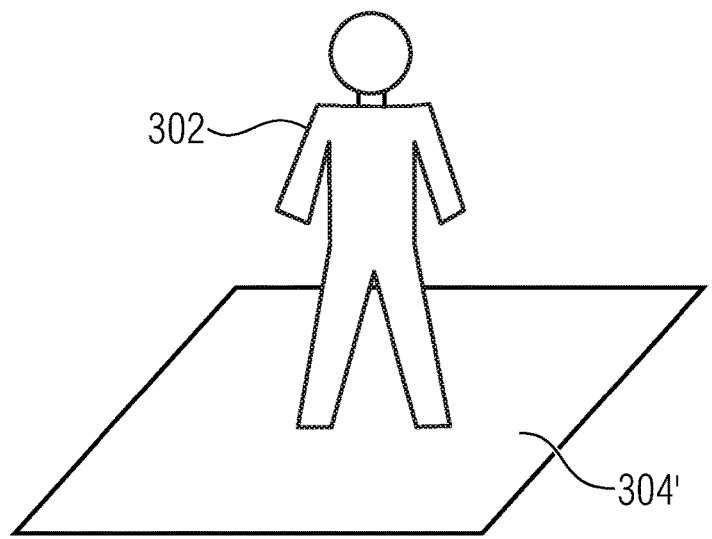

FIG. 3 schematically shows this procedure, FIG. 3(a) showing the scene 300 initially captured, where a person 302 (object) is depicted to be standing on a ground 304. In addition, a rear wall 306 is depicted. Along the Z coordinate, that area 308 which is delimited by the dashed lines 308a, 308b extending in the X direction is depicted. The area 308 is the above-mentioned threshold-value corridor, and in accordance with embodiments, vertices of a 3D model which was generated on the basis of the 3D image of the scene 300 are deleted if they lie outside the threshold-value corridor 308, so that the depiction which is shown in FIG. 3(b) results, wherein only the person 302 and part of the ground 304' remain.

In further embodiments, provision may additionally be made for restricting the threshold-value corridor also in the X direction, as is depicted by the dashed lines 308c and 308d in FIG. 3(a). Vertices having X values lying outside the range of 308' are deleted from the data which describes the 3D model on the basis of the scene 300, so that the remaining ground area 304' may be reduced even further.

The data model of the person 302 which is generated by the 3D engine (see, e.g., FIG. 3(b)) may be a mesh model or a triangular facet, depending on the 3D engine used. At the outer edge of the triangular facet, which remains once the background has been cut off or extracted, noise may result in inaccurate depth values which translate into erroneous portions of the 3D model, e.g., triangles with large depths. In accordance with embodiments, the boundary region of the 3D model may be smoothed by means of a smoothing algorithm, for example by means of a smoothing algorithm filtering out large depth values, or depth distances.

As was mentioned above, an object 100, 302 may be captured from several perspectives. One reason for the several pictures taken may consist in that the object is to be fully imaged, so that there will be a complete 3D model. In such a case, but also in a case where only part of the object, e.g., a front side of a person or of an object, is imaged, a situation may occur where due to the design of the object, e.g., due to a part of a person's body being covered by the person's hand or by a projecting portion of an object, any portions located further in the background are not captured by said one 3D image. This results in so-called holes in the 3D image, which may be discerned as black dots in the 3D model, e.g., in the triangular facet. When using a 3D camera, said holes arise because the distance of the infrared sensor and the imaging camera amounts to several centimeters, so that the pyramids of vision of both sensors are not fully congruent. Perspective concealments, e.g., a person's hand in front of their body, thus result in areas which comprise no triangular facet or no portion of the 3D model as their basis, or in areas which have no image texture.

These problems are solved, in accordance with embodiments, by using at least two 3D cameras; in accordance with other embodiments, more than two 3D cameras are used which are arranged at a distance from one another, so that the 3D images produced as a result at least partly overlap. This enables covering those regions of a first 3D image which contain any of the above-mentioned holes by the 3D image(s) of the further camera(s). For example, a triangular facet is created by means of triangulation from the vertex values of each 3D image, i.e., from the various point clouds of the various 3D images, and the images captured are projected onto said triangular facet. Triangulation may be performed, e.g., by using the Delaunay method or by using a height field. If one places both triangular facets above each other, no more black areas will be seen which contain no 3D information or no color information.

The textured 3D models, or triangular facets, which are obtained in the manner described above, of different, overlapping views of the person are subsequently combined, in accordance with embodiments, to form a 360° all-around view of the person. Two overlapping triangular facets are in each case made to superpose in overlap areas, and starting with a predefined plane, e.g., a horizontal plane (X-Z plane), those vertices which exhibit predetermined mutual distances will be identified. Depending on the selection of the distance, the amount of data will result, and the distance may be varied as a function of the circumstances. For example, as a function of the subsequent transmission of the data, in case the transmission medium is known, the amount of data can be adapted to a bandwidth, and the distance may be determined accordingly. The points identified are combined in a new triangular facet, and once a point set, e.g., a circular point set, has been found at one level, the method will move to the next level up, which will be repeated until the relevant point cloud or the relevant vertices for the outer shell of the object have been found. For example, all of the resulting points may be depicted from bottom to top in a connected helix. As a result, a textured, combined point cloud of the outer shell of the object will be obtained as a frame, in brief, a multitude of X, Y, Z values having an order.

Figure 4:
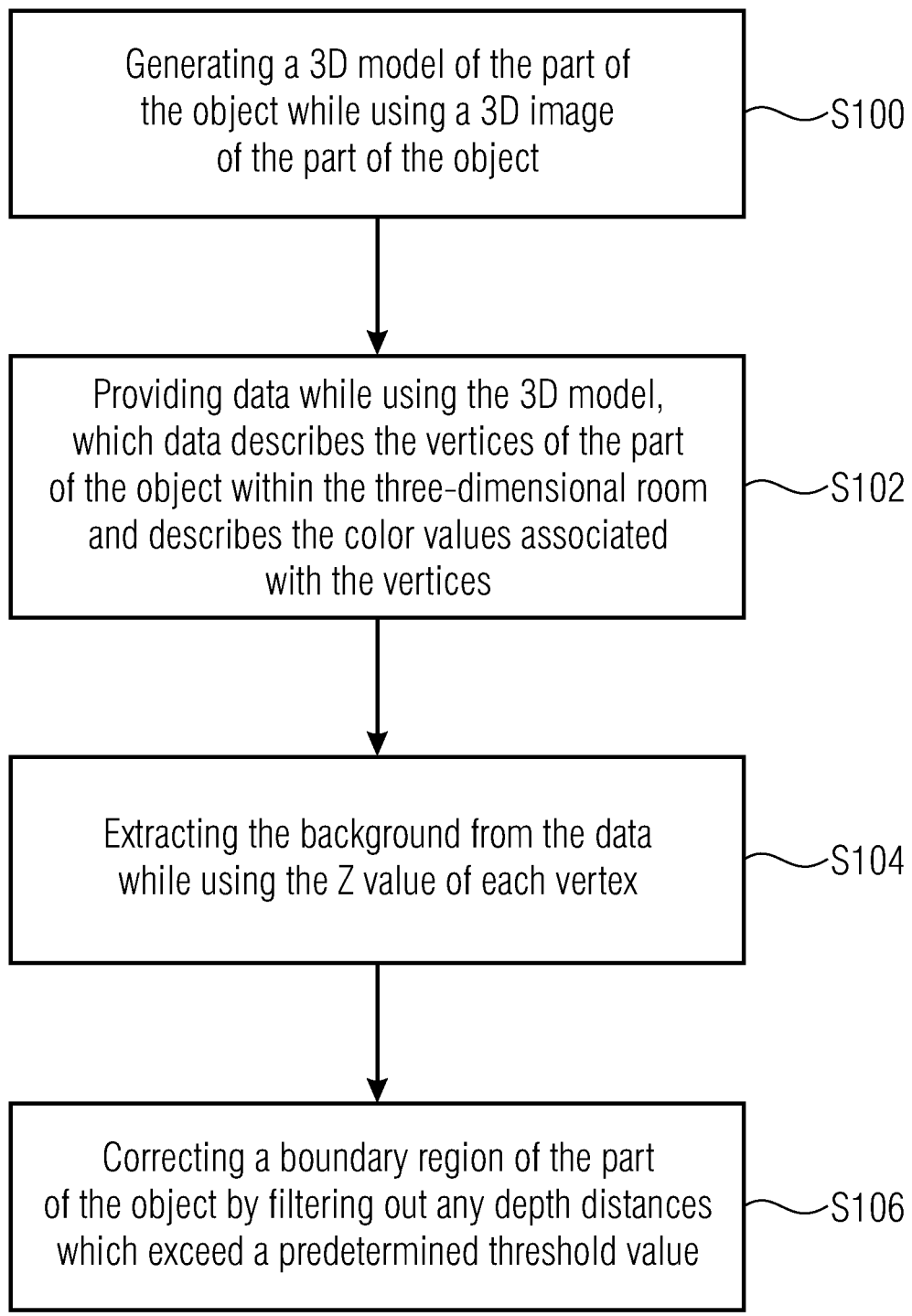
FIG. 4 shows a flow chart of an embodiment of the method in accordance with embodiments for generating data for three-dimensional depiction of at least part of an object.

FIG. 4 shows a flowchart of an embodiment of the method for generating data for three-dimensional depiction of at least part of an object, as was explained above. A first step S100 comprises generating a 3D model of the part of the object while using a 3D image of the part of the object. Step 102 comprises providing data while using the 3D model, which data describes the vertices of the part of the object within the three-dimensional room and describes the color values associated with the vertices. As an optional step, the method includes extracting S104 of the background from the data while using the Z value of each vertex, as was described above, and as a further optional step, the method includes correcting S106 of a boundary region of the part of the object by filtering out any depth distances which exceed a predetermined threshold value, as was explained above. In accordance with embodiments, correction of the boundary region may include anti-aliasing and the avoidance of spikes, which contain large depth values with a steep rise. In accordance with embodiments, steps S100 to S106 are repeated for generating a 3D live sequence, or a 3D film, for each frame of the sequence/of the film, each frame being a single image of the sequence/of the film. In accordance with embodiments, the repetition rate amounts to 30 frames per second. In accordance with embodiments, texture information between the vertex values may be interpolated and thus involve little data width.

Figure 5:
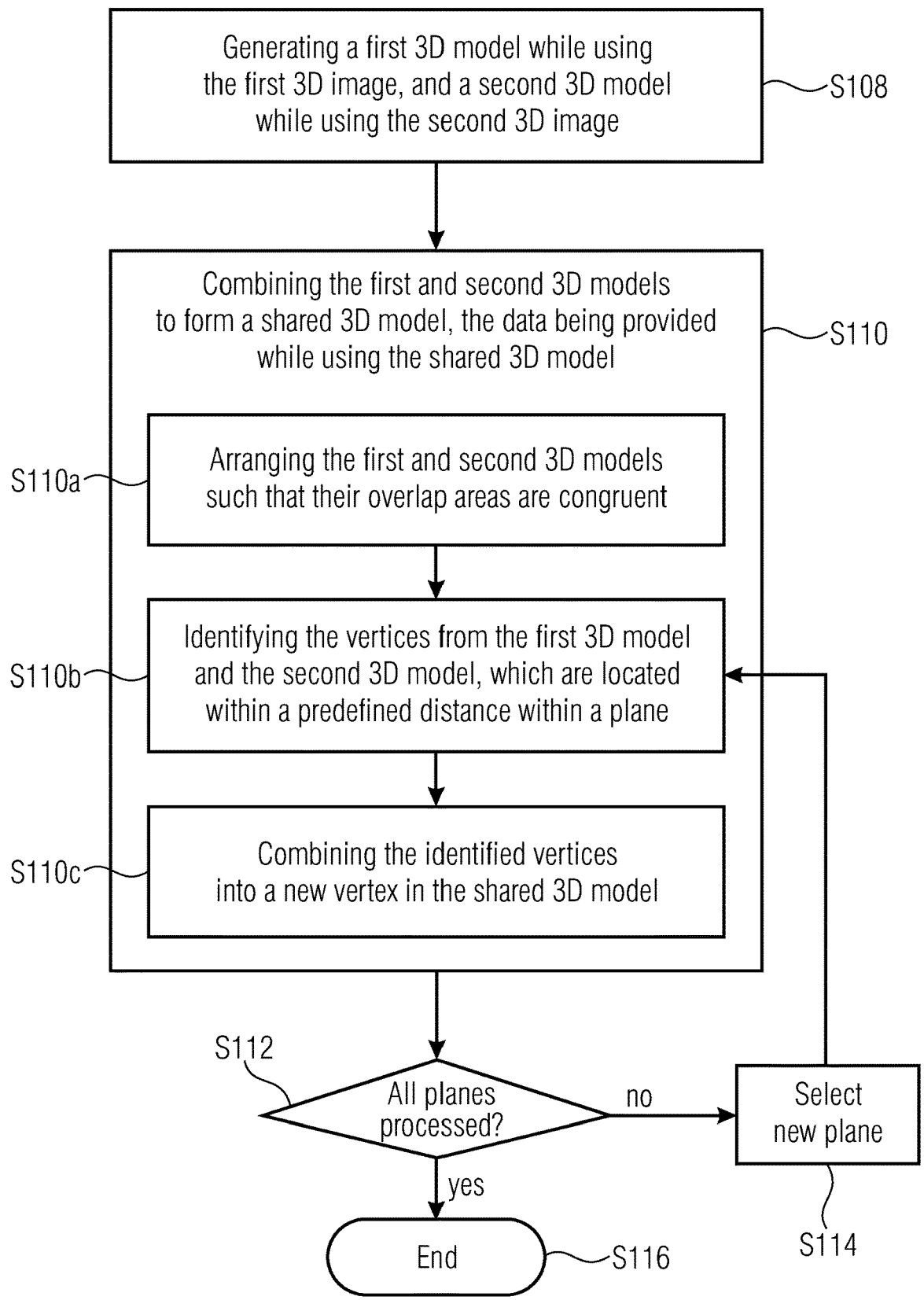
FIG. 5 shows a flowchart of an embodiment, wherein the 3D model is generated by using at least a first 3D image and a second 3D image of the object from two different positions, respectively, which at least partly overlap.

FIG. 5 shows a flowchart comprising further steps in accordance with embodiments, wherein the 3D model is generated from respectively different, at least partly overlapping positions while using at least a first 3D image and a second 3D image of the object. Step S108 comprises generating a first 3D model while using the first 3D image, and a second 3D model while using the second 3D image. Step 110 comprises combining the first and second 3D models to form a shared 3D model, wherein the data provided in step S102 (see FIG. 4) are generated and provided while using the shared 3D model. Combining the two 3D models includes, in accordance with the embodiment depicted, step S110a, wherein the two 3D models are arranged such that their overlap areas are congruent. Step S110b includes defining the vertices which are located within a predefined distance, and step S110c comprises combining the identified vertices. Steps S110a to S110c are repeated if it is found in step S112 that not all of the predetermined planes have been processed with regard to the 3D model. In this case, step S114 comprises selecting a further plane, and the method returns to step S110b. On the other hand, if it is found in step S112 that all of the planes have been processed, the method ends in step S116.

The embodiments described by means of FIGS. 4 and 5 were explained in connection with generating 3D depictions for an object or for a person; however, the embodiments described are not limited thereto. In accordance with other embodiments, the object may also be the background of a room which is to be displayed, on the receiver side, such that a user on the receiver side may view the room from different perspectives and may also move within the room within predetermined limits. In this case, the 3D image includes a 3D image of the background of a room, e.g., in accordance with steps S100 to S116, however without step S104 since removal of the background at this point is obviously not useful. In the method of FIG. 5, the steps performed in block S110 lead to a combination of the various images of the interior so as to generate the inner shell of the room. In accordance with embodiments, provision may be made for defining, when depicting the thus generated three-dimensional room on the receiver side, an area, e.g., a circular area, wherein a user may "move freely" so as to obtain the illusion of a live 3D film.

A further embodiment will be explained below in more detail which offers a possibility of modifying a human face. Such approaches are about modifying a picture of a person who looks like another person, e.g., a well-known character, e.g., in the area of the face to such an extent that the similarity becomes even more pronounced. In this embodiment, a change is caused in the 3D model, or the triangular facet, at a high frequency, and the resulting animation consists, just like in a movie, of a sequence of completely new triangular facets which are displayed successively so as to convey to the human viewer the appearance of a moving picture. Consequently, to the human eye, continuous movement in three dimensions arises since the eyes can no longer differentiate between the discrete states since their succession is too fast. If said changes are displayed on an autostereoscopic monitor fast enough, a hologram illusion will arise for a human being looking with both their eyes. Said hologram illusion may be changed during runtime.

Figure 6:
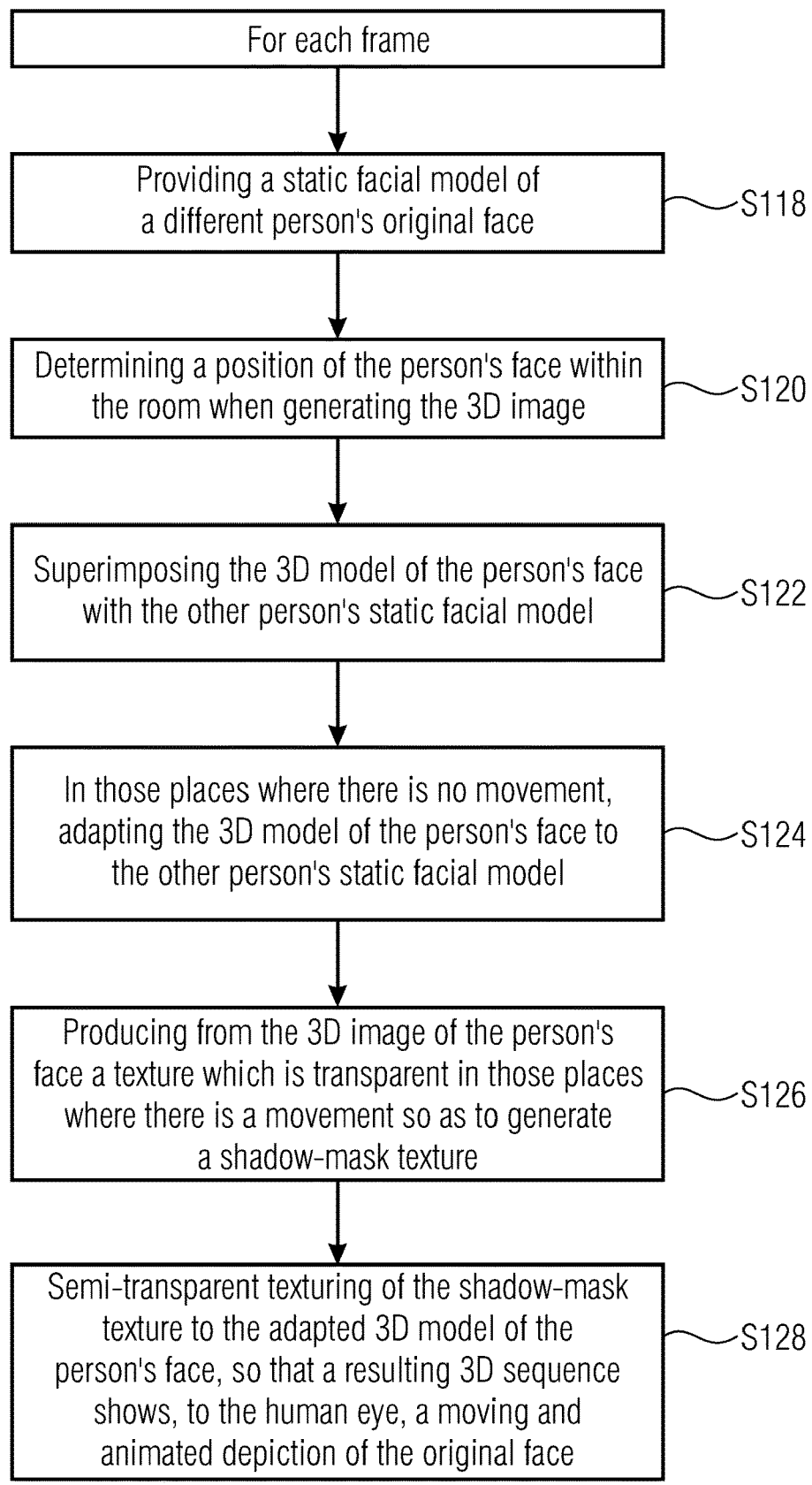
FIG. 6 shows a flow chart depicting an embodiment for modifying a human face.

FIG. 6 shows a flowchart exemplifying the embodiment of changing a human face. The method is based on an object depicting a person's face, and a step S118 comprises initially providing a static facial model of different person's original face. The first position may be a so-called look-a-like person, for example, who looks like the other person, e.g., a well-known person. The facial model of the other person's original face is a static 3D model with a texture, which has resulted, e.g., from a photograph or shot of the other person and may thus have a correspondingly high recognition factor.

Step S120 comprises determining a position of the person's face in the room when generating the 3D image. To this end, e.g., a position finding system, e.g., Nexonar, which is a device which is equipped with a sonar sensor and is worn at the back of the head, or ray casting may be used. Once the position of the face has been determined, step S122 comprises superposing the 3D model of the person's face with the other person's static facial model, and step S124 comprises adapting the 3D model of the person's face to the other person's static facial model in those places where there is no movement. For example, the difference between both 3D models or triangular facets may be summed in those places where there is no movement, e.g., in the area of the nose, the cheeks and like, so that a shared 3D model, or 3D mesh, results, which due to the fact that the steps which have just been described are performed for each frame/single image of the 3D film, updates itself during runtime.

Step S126 comprises producing a texture from the 3D image of the person's face, specifically in those places where there is movement, so as to generate a shadow-mask texture which in step S128 is semi-transparently textured to the shared or new 3D model so as to obtain, during runtime, a 3D model which can be recognized, by human eyes, as a sequence of a moving and animated depiction of the original face.

Figure 7:
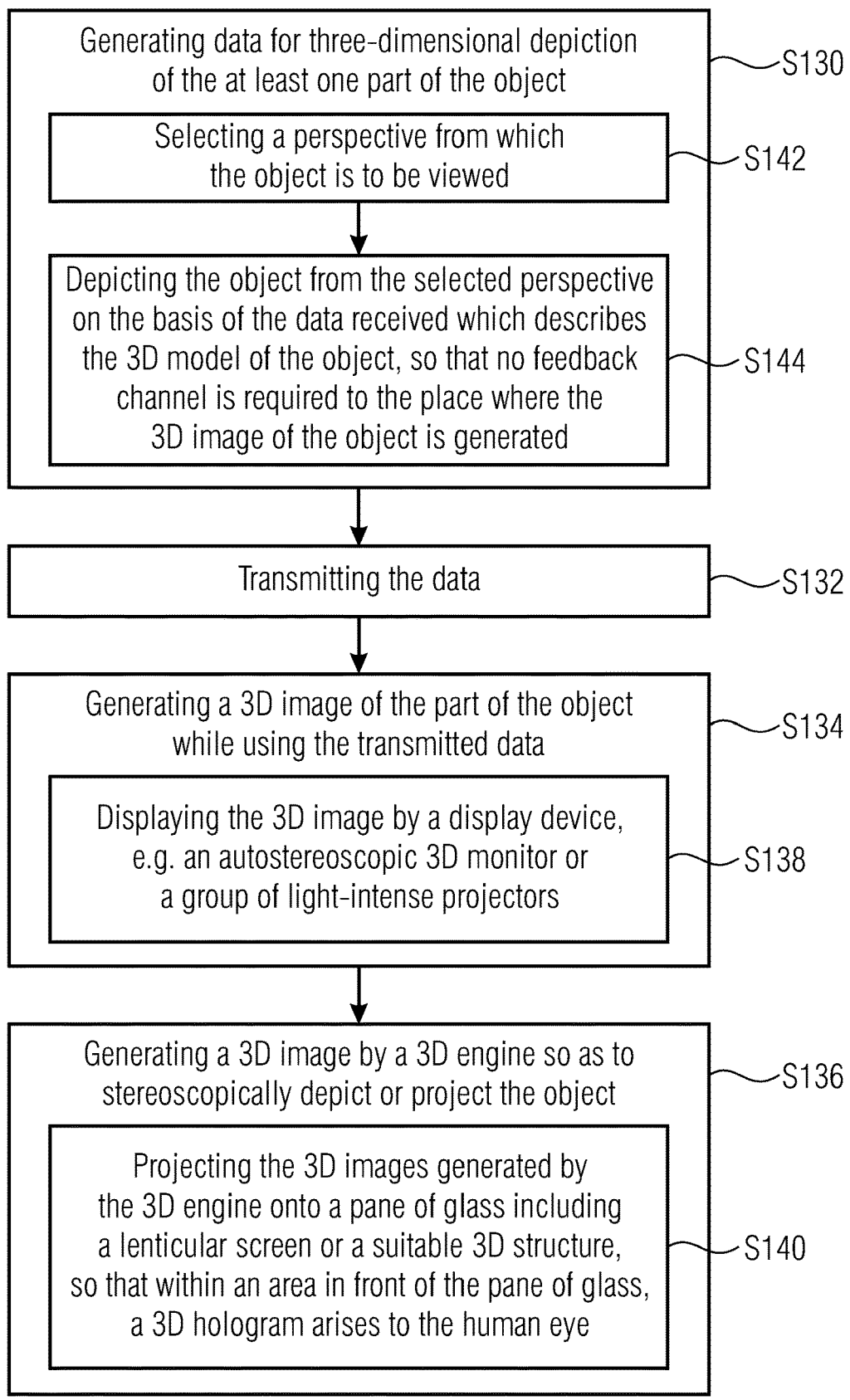
FIG. 7 shows a flow chart of an embodiment of the described method of generating a three-dimensional representation of at least part of an object as is performed, e.g., by the system described with reference to FIG. 2.

An embodiment of generating a three-dimensional depiction of at least part of an object will be explained in more detail below with reference to FIG. 7, said method being performed, e.g., by the system described by means of FIG. 2. A first step S130 comprises generating data for the three-dimensional depiction of the at least one part of the object, specifically in accordance with the above-described method as was explained, e.g., by means of FIGS. 4, 5 and 6 or was explained by means of the receiver side 202 in FIG. 2. Subsequently, step S132 comprises transmitting the data from the transmitter side 202 to the receiver side 204 via the transmission medium 106 (see FIG. 2), and step S134 comprises generating the 3D images 100a and 100b shown in FIG. 2, e.g., by the 3D engine 210 on the receiver side 204. As is shown in step S136 in FIG. 7, generation of the 3D image is performed by a 3D engine so as to stereoscopically depict or project the object. In accordance with an embodiment (see step S138), the 3D image is displayed by a display device, e.g., an autostereoscopic 3D monitor 108 or a group of light-intense projectors.

Prior to transmission in step S132, the data generated in step S130 may once again be suitably reduced by means of quantization, in accordance with an embodiment, however at the expense of a loss of data. Moreover, provision may be made, in accordance with other embodiments, for applying region-of-interest encoding (RoI encoding) to the amount of data provided by step S130; also, differential encoding of individual, successive frames/single images is feasible. Moreover, the data set may be subjected to binary coding and may be further reduced, e.g., by means of run-length coding and similar approaches known in conventional technology.

Transmission in step S132 may be effected via the internet or an intranet, e.g., by a client-server relationship while using the TCP-IP protocol, the UDP protocol, or the server-side protocol. Alternatively or additionally, transmission S132 may also result in local storing of the received single images/frames as a local file.

In step S134, provision may be made, prior to the data being provided to the 3D engine 210, for unpacking of the data in accordance with their coding prior to transmission, and for buffering thereof, said buffering being provided to ensure that once an initial, desired filling state has been reached, continuous processing of the data packets will be possible, even at different or varying data rates at which the corresponding data packets are received at the receiver.

In accordance with an embodiment, step S138 may comprise displaying while using the stereoscopic 3D Pepper's Ghost method for generating holograms, as depicted in step S140, wherein an autostereoscopic 3D monitor or a group of light-intense projectors is provided, so as to project suitable 3D images, e.g., the images 100a, 100b generated by the 3D engine 210 (see FIG. 2), onto a pane of glass, which includes a lenticular screen or a suitable 3D structure, so that in a predetermined line of vision, a 3D hologram arises to the human eye in front of the pane of glass.

In accordance with further embodiments, provision may be made, e.g., for a user to select a perspective, on the receiver side, from which the object is to be viewed, as indicated in step S142, and in accordance with step S144, the object is subsequently depicted from the selected perspective, on the basis of the received data which describes the 3D model of the object, without a feedback channel needing to being used to the point where the 3D image of the object is generated. This is a particularly advantageous embodiment since it involves generating, on the receiver side, a 3D model of the object or of part of the object which will be transmitted to the receiver side in the above-described manner, with a reduced amount of data, and which enables retrieving of the original 3D model on the receiver side when using a corresponding 3D engine, so that on the receiver side, the entire object is depicted in 3D. For example, if the entire object has been detected and processed as a 3D model, the possibility will be provided, on the receiver side, for a user to freely select a perspective with which he/she wishes to view the corresponding object, and in accordance with the selected perspective, the 3D images that may be used for the corresponding depiction will be generated from the 3D model on the receiver side. In this manner, one may freely determine, on the receiver side, the perspective, or angles of view, from which a 3D model is to be viewed, so that the corresponding 3D images may then be generated for depiction on the receiver-side monitor without requiring a new picture to be taken and, thus, without requiring renewed transmission of the data or without requiring a feedback channel to the transmitter. Said implementation is advantageously employed in the following applications:

presentations at trade fairs or in shows with panes of glass of the size of a person or bigger;

communication application on the desk, e.g., in the form of a pane of glass of the size of a monitor, which is retractable from the desk and on which a hologram of a communication partner's face appears;

in the home surroundings, where a pane of glass which comprises projection hardware is installed in any size, or external window panes, so that one or more communication partners may be portrayed, as a hologram, as standing in the home environment.

The procedure as was described in detail above with regard to the various embodiments is advantageously employed, in accordance with embodiments, in the following applications:
- interactive and immersive 3D film for film contents of any kind;
- communication in multi-user 3D worlds, e.g., for E-learning, edutainment, distribution, politics, entertainment, shows;
- more realistic avatars for games and entertainment;
- virtual greeters as portrayals of persons for local communication with people;
- virtual mirrors which indicate different clothes on a person;
- monitoring of machines in production plants within the context of Industry 4.0 and Internet of Things and logistics, operation and procurement of wearing parts;
- surveillance of persons in critical infrastructures, e.g., border surveillance,
- training and simulation of dangerous or non-existing environments with human interactions.

In addition, the present embodiments are applied in surveillance as depiction and transmission of changing contents. For some applications, surveillance, recognition and transmission of changing contents are particularly important. In this context, differences of a static 3D model within specific limits (threshold values) as compared to a captured live image are generated so as to recognize any changes faster and more accurately than in a 2D video recording. For example, let us look at surveillance of a drilling rig. A static 3D model of the drilling rig is compared to a 3D image from an angle of view toward the drilling rig several times per second; for example, the drilling rig may be animated via the 3D engine during runtime. Any changes which occur in the live 3D model, such as a person entering into a picture-taking area, are compared to the static 3D model and may trigger alerts. For a 3D vision of the situation and of the location of the rig including the person, only transmission of the differences may be used since the static rig already exists as a 3D model, which is advantageous as compared to complete video transmission with regard to the amount of data, the speed, the 3D spatial view with an interactive visual focus and with an interactive quality of depiction, and to the quality of visualization.

Further embodiments will be described below, and/or embodiments which have already been described will be detailed below. For example, embodiments provide a method of generating data for two- or three-dimensional depiction of at least part of an object, comprising:
- generating a 3D model of the part of the object while using a 3D image of the part of the object; and
- providing, while using the 3D model, data describing the vertices of the part of the object within the three-dimensional room and describing the color values associated with the vertices.

The approach to generating data for two- or three-dimensional depiction is advantageous since unlike conventional approaches, it does without transmitting two-dimensional image data, which involves a large amount of expenditure. Rather, a 3D model is created on the basis of the three-dimensional image data depicting a 3D image of the part of the object, said 3D model depicting at least that part of the object of which the 3D image was obtained. Said 3D model may be a mesh model or triangular facet, for example, as is known, e.g., from the field of CAD technology. The model thus obtained may be described by the positions of the vertices within three-dimensional space, for example, in the Cartesian coordinate system, by the X, Y and Z values of the vertices. In addition, the color values may be associated with the corresponding vertices, possibly texture information is also transmitted. The amount of data generated in this manner is many times smaller than the amount of data that arises in the transmission of a 2D image of a size of 1024×768 pixels, so that in this manner, fast and non-delay transmission of the data via a transmission medium is enabled due to the small amount of data involved in depicting the object in a three-dimensional form; in particular, the problems arising in the context of the large amounts of data which conventionally have been used in conventional technology are prevented. The data thus generated may be used either for generating a three-dimensional depiction (e.g., a 3D live sequence of a 3D film) or for generating a two-dimensional depiction (e.g., a 2D live sequence or a 2D film) on a suitable display device for depicting the object or the part of the object.

In accordance with embodiments, the 3D image includes the part of the object and a background, the method further including extracting of the background from the data while using the Z value of each vertex, for example by removing a vertex from the data if the Z value of the vertex lies outside a predefined range. In accordance with embodiments, provision may additionally be made for correcting the boundary region of the object by filtering out any depth distances which exceed a predetermined threshold value.

Said procedure is advantageous since in this manner, the captured object may be depicted in a simple manner without the background, which has also been captured, and since in this manner, only the data for the actual object is generated rather than the background data which may possibly not even be required, so that consequently, a further reduction of the amount of data is achieved. In addition, this procedure enables the object, which is to be depicted in a three-dimensional manner by means of the data generated, to be depicted on the receive side in a different context, e.g., against a different background.

In accordance with embodiments, the 3D model is generated while using at least a first 3D image and a second 3D image of the object from different positions, respectively, wherein the first and second 3D images at least partly overlap. The different positions may be selected such that one area of the object which is not visible in the first 3D image of the object will be visible in the second 3D image of the object. In accordance with embodiments, provision may be made for generating a first 3D model while using the first 3D image, and for generating a second 3D model while using the second 3D image, and for combining the first and second 3D models to form a shared 3D model, the data being provided while using the shared 3D model. In accordance with embodiments, combining of the first and second 3D models to form a shared 3D model may include the following: arranging the first and second 3D models such their overlap areas are congruent, identifying the vertices from the first 3D model and the second 3D model, which are located within a predefined distance within a plane; and combining the identified vertices into a new vertex in the shared 3D model. Advantageously, said identifying and combining are repeated for a plurality of planes, the number and the distances between the plurality of planes being selected such that the part of the object is depicted by the shared 3D model.

In accordance with embodiments, provision may be made for a plurality of 3D pictures of the object which have been taken from different, at least partly overlapping positions are used for generating the 3D model, so that the 3D includes several portions of the object, or even the entire object.

This implementation is advantageous since it ensures that all of the areas of that part of the object which is to be depicted three-dimensionally are described by corresponding data of the 3D model, so that, in particular, portions of the object which are not shown in one depiction will be recognized due to the second depiction in which they are shown from a different perspective, or from a different angle of view, and will be merged. This enables, in particular for the event of there being a plurality of pictures taken from several angles of view, generation of a 3D model of the entire object, which will then be described in accordance with the vertices and the color values of the 3D model, so that upon retrieval of the images it will be possible to view the object from any definable perspective, in particular to view without any erroneous or missing places.

In accordance with embodiments, providing of the data includes reducing the amount of data without any loss of data by determining the spatial distances of the vertices; and encoding the spatial distances as sequential differences while starting from a predefined starting point. In accordance with embodiments, provision may be made for starting encoding at a lower point of the object and continuing in a spiral shape up to an upper point of the object.

This procedure is advantageous since in this manner, further reduction of the amount of data is enabled without a loss in data occurring, since on the basis of the starting point, which is fully encoded, only the values differing from the positions of the adjacent vertices are to be defined, which results in the above-mentioned further reduction of the amount of data.

In accordance with embodiments, generating the 3D model includes providing the 3D image of the object or of the part of the object by a 3D camera or providing a stereoscopic image of the object or of the part of the object.

This implementation is advantageous since one may fall back on known approaches to generating 3D images and/or stereoscopic images, which will then serve as an input for the process performed, e.g., by a 3D engine so as to capture the 3D model and to encode it accordingly.

In accordance with embodiments, the object is a person, an animal, a thing or a background.

This procedure is advantageous since the approach is not subject to any restrictions regarding the object to be depicted since a clearly reduced set of data may be obtained, in the manner described, from the 3D images of the object for describing said object in a three-dimensional form. If the object is a background, this is advantageous since there is the possibility, as a result, of providing a desired background and of providing a remote position for depiction in a three-dimensional implementation. In particular, depiction of the entire background, for example of a room which is three-dimensionally captured by several cameras, enables creating data for depicting the background on the basis of the 3D model, which data is transmitted at a reduced amount of data and enables, at the place of reception, generating the background, e.g., the room, such that an viewer located at the receiving location will be able to perceive the background from any position/perspective.

In accordance with embodiments, generation of the 3D model and provision of the data are repeated at a predetermined repetition rate so as to generate a multitude of successive frames, each of which contains the data provided and may be displayed as a 3D sequence. Advantageously, the repetition rate is selected such that up to 30 frames are generated within one second.

This procedure is advantageous since it offers the possibility of generating 3D sequences or 3D films which may be transmitted, due to the small amount of data of each individual frame, without any problems regarding the transmission duration, the transmission bandwidth and the amount of data from that point where the data is generated to a receive position where the data is to be displayed. Unlike in conventional technology, this procedure enables for the first time reliable and fast generation of data for depicting a 3D film, or a 3D sequence, which are suitable for transmission via a transmission medium having a limited bandwidth, e.g., the internet.

In accordance with embodiments, the object is at least a person's face, and the present method includes for each frame: providing a static facial model of a different person's original face, determining a position of the person's face within the room when generating the 3D image, superposing the 3D model of the person's face with the other person's static facial model, in those places where there is no movement, adapting the 3D model of the person's face to the other person's static facial model, producing, from the 3D image of the person's face, a texture which is transparent in those places where there is a movement so as to generate a shadow-mask texture, and semi-transparent texturing of the shadow-mask texture to the adapted 3D model of the person's face, so that a resulting 3D sequence shows, to the human eye, a moving and animated depiction of the original face.

This procedure is advantageous since it enables in a simple manner associating, with a person who is similar to a known person with regard to physique and build, the facial contours of said other person, so that the provided data, which due to the inventive procedure comprises a small amount of data, may be processed at the receiving point such that the viewer located there will gain the impression that the other person is depicted, which is advantageous in particular in the field of the entertainment industry and similar areas.

Embodiments further provide a method of generating a two- or three-dimensional depiction of at least part of an object comprising:
  generating data for the two- or three-dimensional depiction of the at least one part of the object in accordance with the method described;
  transmitting the data; and
  generating a 2D or 3D image of the part of the object while using the transmitted data.

This procedure is advantageous since due to the approach described, the data generated for three-dimensional depiction comprises only a small amount of data and is thus transmitted easily. The data which is thus received and which indicates the 3D model enables, by applying a 3D engine, generating of a corresponding 3D image of the part of the object, which 3D image may then be used in a conventional manner for three-dimensional depiction on a display device, e.g., a stereoscopic monitor. This may be performed, e.g., by generating a 3D image by means of the 3D engine so as to stereoscopically depict or project the object. Advantageously, the 3D engine generates up to 30 3D images per second, which is advantageous since in this manner, moving pictures, i.e., 3D images or 3D sequences, may be generated from the data received.

In accordance with embodiments, the method includes displaying the 3D image by means of a display device, e.g., an autostereoscopic 3D monitor or by means by a group of light-intense projectors, wherein provision may be made for the display device to operate while using the stereoscopic 3D Pepper's Ghost method of producing holograms. In this implementation, the method may include projecting the 3D images generated by the 3D engine onto a pane of glass including a lenticular screen or a suitable 3D structure, so that within an area in front of the pane of glass, a 3D hologram arises to the human eye.

This procedure is advantageous since it provides the possibility of using conventional display devices for generating 3D depictions of objects which operate on the basis of input data as is also used in conventional technology but is produced on the basis of the data generated from the 3D model.

In accordance with embodiments, transmission of the data may include transmission via the internet or an intranet, e.g., by a client-server relationship, for example while using the TCP-IP, the UDP or the server-side protocols. Alternatively or additionally, local storing of the data as a file may also be provided.

This procedure is advantageous since conventional transmission media are employed since on account of the procedure described, no specific requirements are placed upon the bandwidth and transmission capacity provided.

In accordance with embodiments, provision may be made, on the receiver side, for selecting a perspective from which the object is to be viewed, and for depicting the object from the selected perspective on the basis of the data received, the data describing the 3D model of the object, so that no feedback channel is required to the place where the 3D image of the object is generated.

This procedure represents a particular advantage of the approach described since on the receiver side, a 3D model of the object or of a part of the object is generated which is transmitted to the receiver side with a reduced amount of data in the above-described manner. This enables retrieving the original 3D model on the receiver side when using a corresponding 3D engine, so that on the receiver side, the entire object is depicted in 3D. If the entire object has been detected and processed as a 3D model, the possibility will be provided, on the receiver side, for e.g. a user to select a perspective from which he/she wishes to view the corresponding object, and in accordance with the selected perspective, the 3D images that may be used for the corresponding depiction will be generated from the 3D model on the receiver side. Such a procedure is not readily possible in conventional technology since the images present on the receiver side are only those images which have been generated on the transmitter side and are to be combined for the purpose of three-dimensional depiction on the display. To obtain a different perspective it is useful to generate, on the transmitter side, a corresponding different image from a different perspective and to transmit same so as to then enable a depiction accordingly. On the one hand, this involves repeated transmission of the data, which involves the problems which have already been described above in terms of the large amount of data, and on the other hand, a feedback channel from the receiver to the transmitter side would be useful for transmitting the changed perspective to the transmitter so as to enable taking the desired new picture. This problem is avoided by the invention since the 3D model of the object, or of the part of the object, is already present on the receiver side, so that one may determine on the receiver side the perspective from which this 3D model is to be viewed, so that the corresponding 3D images for depiction on the receiver-side monitor may then be generated without requiring a new picture to be taken and, thus, without requiring the data to be transmitted again, or without requiring a feedback channel to the transmitter.

Embodiments further provide a computer program comprising instructions for performing the method when the instructions are executed by a computer, which is why the above-mentioned advantages will also be achieved in the event of a computer implementation of the approach described.

Embodiments further provide a device for generating data for two- or three-dimensional depiction of at least part of an object, comprising:
an input configured to receive a 3D image of the part of the object;
a 3D engine connected to the input and configured to generate a 3D model of the part of the object while using the received 3D image, and to generate, while using the 3D model, data describing the vertices of the part of the object in the three-dimensional room and describing the color values associated with the vertices; and
an output connected to the 3D engine and configured to provide the data generated, In accordance with embodiments, the 3D engine is configured to extract a background in the 3D image from the data while using the Z value of each vertex, wherein a boundary region of the part of the object is advantageously corrected by filtering out any depth distances which exceed a predetermined threshold value.

In accordance with embodiments, the input is configured to receive at least a first 3D image and a second 3D image of the object from respectively different positions, wherein the first and second 3D images at least partly overlap. The 3D engine is configured to generate the 3D model while using the first 3D image and the second 3D image of the object. The 3D engine advantageously generates a first 3D model while using the first 3D image and a second 3D model while using the second 3D image, and a shared 3D model while using the first and second 3D models, the data being generated while using the shared 3D model.

In accordance with embodiments, the 3D engine causes a reduction of the amount of data without any loss of data in that the spatial distances of the vertices are determined and the spatial distances are encoded, in the form of a helix, as sequential differences while starting from a predefined starting point and ending at an end point.

In accordance with embodiments, the device includes a 3D camera or a stereoscopic picture-taking device for generating the 3D image of the object, said camera or picture-taking device being connected to the input.

In accordance with embodiments, the 3D engine is configured to generate the 3D model and the data at a specific repetition rate so as to generate a multitude of successive frames, each of which contains the data provided and may be displayed as a 3D sequence.

In accordance with embodiments, the object is at least a person's face, and the 3D engine is configured to determine, for each frame, a position of the person's face within the room when generating the 3D image so as to superpose the 3D model of the person's face with a static facial model of a different person's original face, to adapt the 3D model of the person's face to the other person's static facial model in those places where there is no movement, to produce a texture from the 3D image of the person's face, said texture being transparent in those places where there is movement, to generate a shadow-mask texture, and to texture the shadow-mask texture to the adapted 3D model of the person's face in a semi-transparent manner, so that a resulting 3D sequence shows, to the human eye, a moving and animated depiction of the original face.

The embodiments which have just been mentioned offer the advantages explained above in connection with the method described.

Embodiments provide a system for generating a two- or three-dimensional representation of at least part of an object, comprising:
- a device for generating data for the two- or three-dimensional representation of the at least one part of the object in accordance with embodiments,
- a transmission medium for transmitting the data, said transmission medium being connected to the device for generating the data, and
- a 3D engine connected to the transmission medium and configured to generate a 2D or 3D image of the part of the object while using the transmitted data.

In accordance with embodiments, the system includes a display device, e.g., in the form of an autostereoscopic 3D monitor or in the form of a group of light-intense projectors, said display device being connected to the 3D engine. Advantageously, the display device operates while using the stereoscopic 3D Pepper's Ghost method of generating holograms, and is configured to project the 3D images generated by the 3D engine onto a pane of glass which includes a lenticular screen or a suitable 3D structure, so that within an area in front of the pane of glass, a 3D hologram arises to the human eye.

In accordance with embodiments, the 3D engine of the system is configured to receive a choice of a perspective from which the object is to be viewed, and to depict the object from the selected perspective on the basis of the data received which describes the 3D model of the object, so that no feedback channel is required to the place where the 3D image of the object is generated.

The system described has the advantages which were described in more detail above in connection with the method.

Thus, embodiments provide the possibility of interactive real-time 3D graphics. The problem existing in conventional technology with regard to the immense amount of data involved in depicting 3D objects is addressed, in accordance with embodiments, with the aid of a 3D engine which has, e.g., a so-called real-time software for depicting computer graphics running on it. When encoding the 3D image data, the spatial component of the 3D model is exploited as a deterministic sequence of spatial distances, so that the amount of data is considerably reduced while the quality is maintained. The amount of data which results as a sequence of spatial distances is smaller by orders of magnitude than the amount of data involved in conventional technology in transmitting 3D image data as a sequence of 2D images. In addition, spatial encoding of distance values may be performed faster than compressing 2D image data, which enables performing real-time live transmission of 3D image data, which can be depicted, given a suitable 3D engine, at the receiver in three dimensions with an interactive change in visual focus or as a stereoscopic film as several 2D images per frame.

Embodiments have been described in the context of the 3D depiction of an object or of a part of the object. In accordance with further embodiments, the approach described may also be employed in a two-dimensional depiction of the object or of the part of the object, e.g., in that the data which has been generated and which reproduces the 3D model is processed is displayed, on the receiver side, only as 2D images or as a 2D image sequence. In this case the above-mentioned advantages over conventional transmission of 2D images will also result.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or actually do cooperate, with a programmable computer system such that the respective method is performed. This is why the digital storage medium may be computer-readable. Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer. The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer. A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for generating a model of an object with superposition image data in a virtual environment, the device comprising:
   a plurality of three-dimensional cameras, configured to generate an image data stream of the object, wherein a three-dimensional camera comprises two cameras arranged at a distance, wherein the plurality of three-dimensional cameras comprises a first three-dimensional camera and a second three-dimensional camera, and the second three-dimensional camera is disposed opposite the first three-dimensional camera to capture the object from two different perspectives;
   a computer processor configured to extract, from the image data stream, a model of the object from a real environment, to insert the extracted model into the virtual environment, and to superpose at least part of the model with superposition image data so as to generate the model of the object with superposition image data in the virtual environment; and
   a monitor configured to display the model of the object with superposition image data in the virtual environment;
   wherein the superposition image data is captured by the plurality of three-dimensional cameras; or
   wherein the plurality of three-dimensional cameras is configured to capture, during an initialization phase, at least part of the object so as to generate the superposition image data, and wherein the plurality of three-dimensional cameras is configured, in a mode of operation, to generate the image data stream of the object,
   wherein the plurality of three-dimensional cameras is configured, during the initialization phase, to scan a person's area of the eyes or a face as the object and to store it as superposition image data, wherein the computer processor is configured, in the mode of operation, to superpose smart glasses worn by the person with the superposition images acquired during the initialization phase,
   wherein the computer processor is configured to adapt the area of the eyes or the face in the superposition image data on the basis of the person's frame of mind and to superpose it with the adapted superposition image data of the person, and
   wherein the plurality of three-dimensional cameras is configured to create a plurality of superposition image data, wherein the computer processor is configured to determine the frame of mind by means of a comparison of current positions of the person's corners of the mouth with positions of the corners of the mouth in the plurality of superposition image data, and to select that superposition image which renders the current facial expression in the best manner possible.

2. The device as claimed in claim 1, wherein the computer processor is configured to determine a current outward appearance of the object and to adapt the superposition image data on the basis of the determined current outward appearance, or to select superposition image data from a plurality of superposition image data on the basis of the determined current outward appearance and to superpose that part of the object with the superposition image data selected.

3. The device as claimed in claim 2, wherein the computer processor is configured to determine the current outward appearance of the object 30 to 60 times per second, 35 to 55 times per second, or 40 to 50 times per second.

4. The device as claimed in claim 1, wherein the computer processor is configured to generate a three-dimensional (3D) model of the object with superposition image data from the image data stream, wherein the monitor is configured to display the 3D model of the object with superposition image data in the virtual environment.

5. The device as claimed in claim 1,
   wherein the computer processor is configured to store the generated superposition image data and to superpose the part of the model with the stored superposition image data so as to generate the model of the object with superposition image data in the virtual environment.

6. A method of generating a model of an object with superposition image data in a virtual environment, the method comprising:
   generating an image data stream of the object;
   extracting a model of the object from the image data stream from a real environment;
   inserting the extracted model into the virtual environment;
   superposing at least part of the object with the superposition image data so as to generate the model of the object with superposition image data in the virtual environment; and
   displaying the model of the object with superposition image data in the virtual environment;
   wherein the superposition image data is captured by a plurality of three-dimensional cameras, wherein a three-dimensional camera comprises two cameras arranged at a distance, wherein the plurality of three-dimensional cameras comprises a first three-dimensional camera and a second three-dimensional camera, and the first three-dimensional camera is disposed opposite the second three-dimensional camera to capture the object from two different perspectives; or
   wherein generating of the image data stream of the object is performed in a mode of operation, and wherein prior to generating the image data stream, at least part of the object is captured by the plurality of three-dimensional cameras during an initialization phase so as to generate the superposition image data,
   wherein during the initialization phase, a person's area of the eyes or face is scanned as an object and stored as superposition image data, wherein smart glasses worn by the person are superposed, in the mode of operation, with the superposition images acquired during the initialization phase,
   wherein the area of the eyes or the face in the superposition image data is adapted on the basis of the person's frame of mind, and is superposed with the adapted superposition image data of the person, and
   wherein a plurality of superposition image data are created, wherein the frame of mind is determined by means of a comparison of current positions of the person's corners of the mouth with positions of the corners of the mouth in the plurality of superposition image data, and the superposition image which renders the current facial expression in the best manner possible is selected.

7. A non-transitory digital storage medium having a computer program stored thereon to perform the method of generating a model of an object with superposition image data in a virtual environment, said method comprising:
- generating an image data stream of the object;
- extracting a model of the object from the image data stream from a real environment;
- inserting the extracted model into the virtual environment;
- superposing at least part of the object with the superposition image data so as to generate the model of the object with superposition image data in the virtual environment; and
- displaying the model of the object with superposition image data in the virtual environment;
- wherein the superposition image data is captured by a plurality of three-dimensional cameras, wherein a three-dimensional camera comprises two cameras arranged at a distance, wherein the plurality of three-dimensional cameras comprises a first three-dimensional camera and a second three-dimensional camera, and the first three-dimensional camera is disposed opposite the second three-dimensional camera to capture the object from two different perspectives; or
- wherein generating of the image data stream of the object is performed in a mode of operation, and wherein prior to generating the image data stream, at least part of the object is captured by the plurality of three-dimensional cameras during an initialization phase so as to generate the superposition image data,
- wherein during the initialization phase, a person's area of the eyes or face is scanned as an object and stored as superposition image data, wherein smart glasses worn by the person are superposed, in the mode of operation, with the superposition images acquired during the initialization phase,
- wherein the area of the eyes or the face in the superposition image data is adapted on the basis of the person's frame of mind, and is superposed with the adapted superposition image data of the person, and
- wherein a plurality of superposition image data are created, wherein the frame of mind is determined by means of a comparison of current positions of the person's corners of the mouth with positions of the corners of the mouth in the plurality of superposition image data, and the superposition image which renders the current facial expression in the best manner possible is selected, when said computer program is run by a computer.

* * * * *